United States Patent [19]

Hata et al.

[11] Patent Number: 5,040,014

[45] Date of Patent: Aug. 13, 1991

[54] CAMERA SYSTEM

[75] Inventors: Koji Hata; Shinichi Nishimura; Toshihiko Ishimura; Takehiro Katoh; Yasuteru Yamano; Masaaki Nakai, all of Osaka, Japan

[73] Assignee: Minolta Camera Kabushiki Kaisha, Osaka, Japan

[21] Appl. No.: 350,461

[22] Filed: May 11, 1989

[30] Foreign Application Priority Data

May 16, 1988 [JP] Japan .................. 63-118625

[51] Int. Cl.⁵ .................. G03B 3/00; G03B 13/18
[52] U.S. Cl. .................. 354/402; 354/429
[58] Field of Search ............... 354/402, 403, 404, 405, 354/406, 407, 408, 409, 410, 429, 433, 432; 358/227

[56] References Cited

U.S. PATENT DOCUMENTS

| | | |
|---|---|---|
| 4,774,401 | 9/1988 | Yamada et al. .................. 354/432 |
| 4,812,912 | 3/1989 | Iida et al. .................. 354/402 |
| 4,821,074 | 4/1989 | Nakai et al. .................. 354/402 |

FOREIGN PATENT DOCUMENTS

| | | |
|---|---|---|
| 60-183879 | 9/1985 | Japan . |
| 61-55618 | 3/1986 | Japan . |
| 63-172209 | 7/1988 | Japan . |
| 63-193133 | 8/1988 | Japan . |

Primary Examiner—W. B. Perkey
Assistant Examiner—Cassandra C. Spyron
Attorney, Agent, or Firm—Burns, Doane, Swecker & Mathis

[57] ABSTRACT

A camera system, having a plurality of light measuring regions respectively corresponding to focus detecting regions, which includes a device for calculating luminance of an object based on measured light values of the light measuring regions and a device for altering the focus detecting regions.

8 Claims, 20 Drawing Sheets

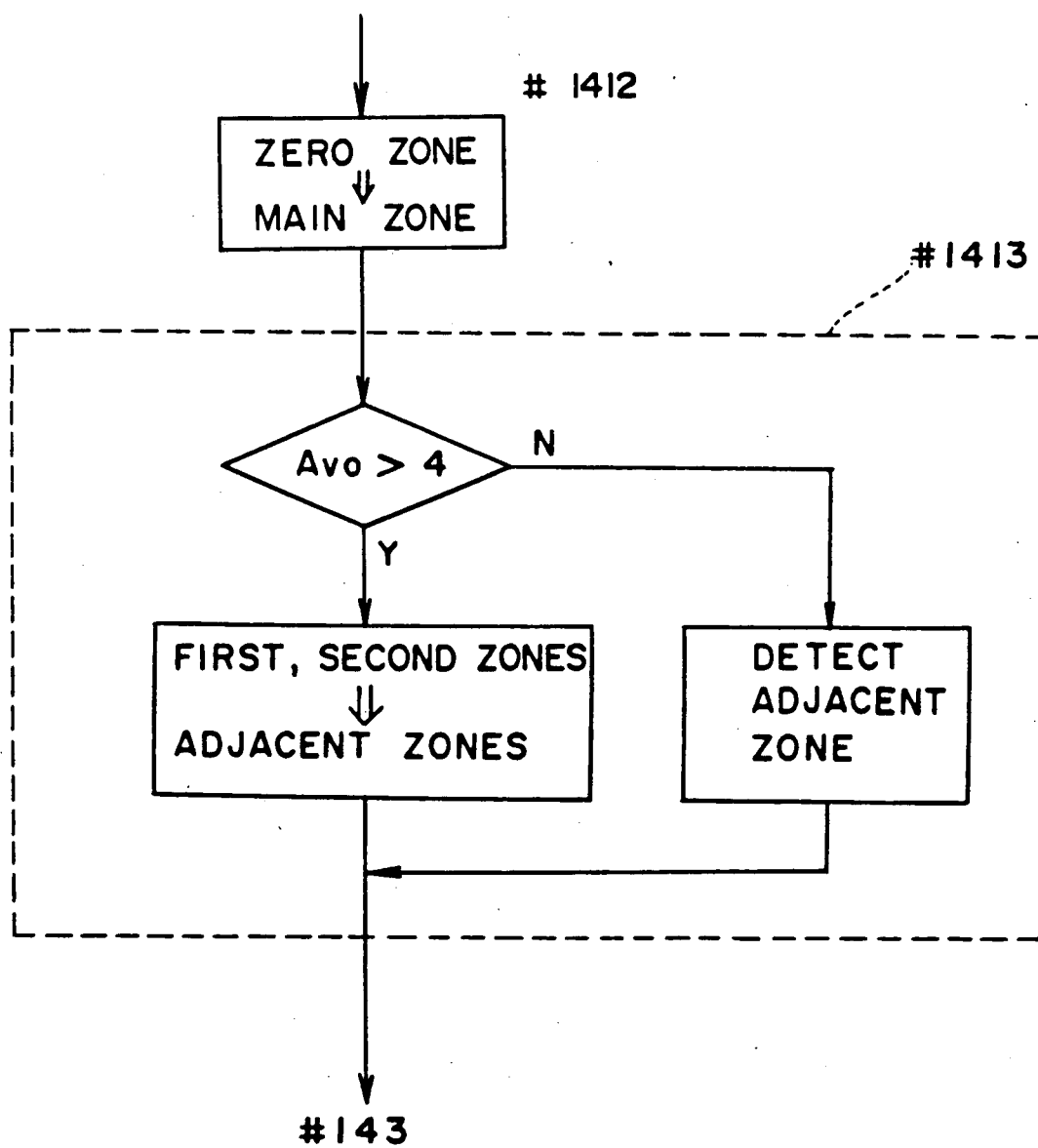

CAMERA SYSTEM

BACKGROUND OF THE INVENTION

1. Field of the Invention

The present invention relates to a camera system having a multi-pattern light measuring apparatus in which brightness or luminance of an object is calculated based on the luminance information from a plurality of divided regions of the photographing image plane.

2. Description of the Related Art

Conventionally, there has been provided a various camera systems having the multi-pattern light measuring apparatus in which the photographing image plane is divided in a plurality of light measuring regions so that the luminance of the object ar calculated based on the luminance information from the respective regions.

One of these conventional camera system is provided with a light measuring apparatus in which the focus detections of some focus detecting regions in the photographing image plane are effected and a spot light measuring of a light measuring region including one of the focus detecting regions which is selected based on the focus detections is performed so that the luminance of the object is calculated based on the measured light values of the light measuring region including the selected focus detecting region (See U.S. Pat. No. 4,423,936). More specifically, according to the above camera system, considering such a fact that a main object intended to be photographed is normally located at a place closest to the camera, one focus detecting region where the closest object is located is chosen from some focus detecting regions and the luminance of the object is calculated based on the measured light value of the light measuring region including the selected focus detecting region. Thereby, the accurate luminance of the main object which is mainly to be photographed can be advantageously obtained without the necessity of the AE lock operation, resulting in an easy operation of camera.

Incidentally, in the above-described camera system having a plurality of focus detecting regions, in some cases a focus detection in connection with a wide area including many regions is desired, while in the other cases a focus detection in connection with a narrow specific area including less regions is required.

If, another object is present between the camera and the main object which one intends to photograph, the accurate luminance of the main object can not be obtained in the above conventional camera system because the luminance of the object closest to the camera is calculated. In order to eliminate the above disadvantage, it is preferable to narrow the focus detecting area to detect only the focusing condition of the regions which do not include said another object.

Conventionally, however, there has been provided no camera system which comprises a light measuring apparatus, in which the luminance of the object is calculated based on the measured light values of the light measuring regions corresponding to the foqus detecting regions where the main object is located, and means for altering the focus detecting area.

SUMMARY OF THE INVENTION

Accordingly, an essential object of the present invention is to provide an improved camera system having a plurality of focus detecting regions and a plurality of light measuring regions respectively corresponding to the focus detecting regions, in which the luminance of the object can be calculated based on the measured light values of the light measuring regions corresponding to the regions where the main object is located and the focus detecting area can be altered.

In accomplishing this and other objects, according to one preferred embodiment of the present invention, there is provided an improved camera system comprising first light measuring means for measuring light incident on a first light measuring region located at a center of a photographing image plane; second light measuring means for measuring lights incident on the other light measuring regions of the photographing image plane different from said first light measuring region; deciding means for deciding a combination of weights to be applied to outputs from said first and second light measuring means; first focus adjusting information outputting means for outputting a first focus adjusting information representing a focus adjusting condition at a first focus detecting region corresponding to said first light measuring region; second focus adjusting information outputting means for outputting a second focus adjusting information representing a focus adjusting condition at a second focus detecting region corresponding to said second light measuring region; switching means for switching alternatively first and second focus detecting modes, the first focus detecting mode detecting the focus adjusting conditions at the first and second focus detecting regions based on the first and second focus adjusting information, the second focus detecting mode detecting the focus adjusting conditions at only the first focus detecting region based on the first focus adjusting information; detecting means for detecting whether or not, the focus adjusting condition at the first focus detecting region and the focus adjusting condition at the second focus detecting region are in a predetermined relationship at the first focus detecting mode; selecting means for selecting one combination of the weights among a plurality of combinations of the weights based on a result of a detection by said detecting means; designating means for designating weights to be applied to the outputs of said first and second light measuring means at the second focus detecting mode; and calculating means for calculating a luminance of an object by applying the weights, which were selected by said selecting means, or the weights, which were designated by said designating means designated, to outputs from said first and second light measuring means.

With the camera system as described above, in the first focus detecting mode for detecting the focusing conditions with respect to the wide area, the weights of both the measured light values of the first and second light measuring regions are decided based on the relationship between the focusing conditions of the first and second focus detecting regions and the luminance of the object is calculated according to the decided weights, while in the second detecting mode for detecting the focusing conditions with respect to the narrow area, the luminance of the object is calculated based on the designated specific weights.

BRIEF DESCRIPTION OF THE DRAWINGS

This and other objects and feature of the present invention will become apparent from the following description taken in conjunction with the preferred embodiments thereof with reference to the accompanying drawings, in which:

FIG. 15 through FIG. 17 are essential parts of flowcharts showing the respective modifications of the present invention;

DETAILED DESCRIPTION OF THE INVENTION

The embodiments of the present invention is described with reference to the drawings.

HARDWARE

Description of System

Figure 1:
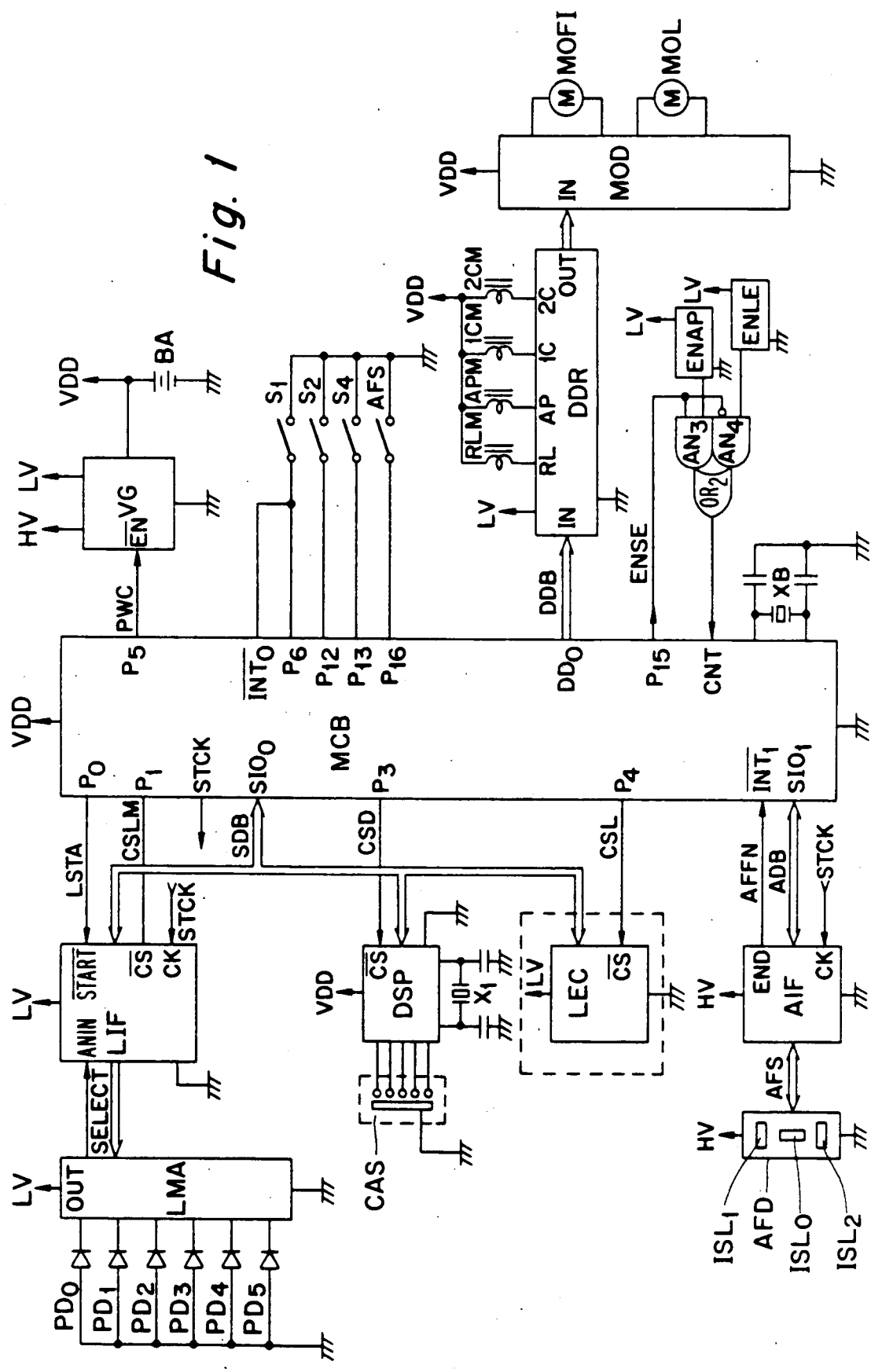
FIG. 1 is a circuit diagram of a camera system which embodies the present invention.

Referring now to the drawings, there is shown in FIG. 1, an electric circuit of a camera system which embodies the present invention. The camera system of the embodiment has a program AE mode (P). The camera system also has a plurality of focus detecting regions, and two focus detecting modes: one is a spot mode for detecting a focusing condition as to only a center focus detecting region, and the other is a wide mode for detecting focusing conditions as to all of the focus detecting regions.

Referring to FIG. 1, a microcomputer MCB provided in a camera body controls the entire camera system. The microcomputer MCB is connected through a serial data bus SDB to a light measuring interface LIF, a display circuit DSP, and a lens circuit LEC. The microcomputer MCB is also connected to an AF interface AIF and a drive circuit DDR through data buses ADB and DDB, respectively.

Figure 2:
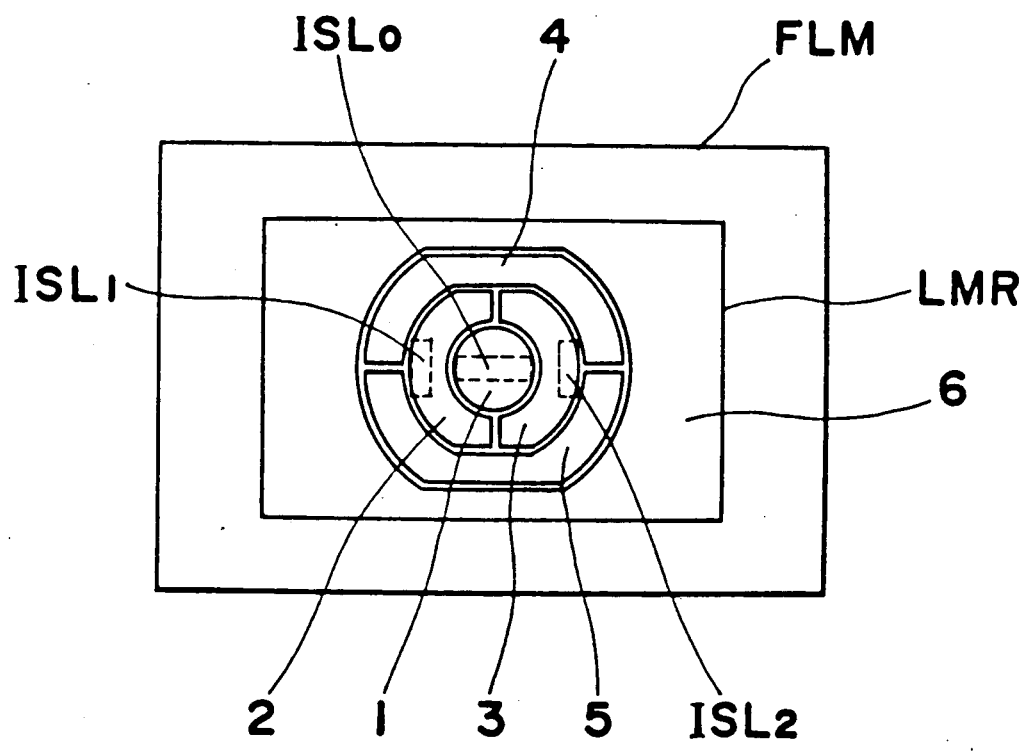
FIG. 2 is a view showing ranges in which lights are measured and regions in which focusing conditions are detected in the camera system.

The light measuring interface LIF is connected to a light measuring circuit LMA connected with six photodiodes $PD_0 \sim PD_5$. The photodiodes $PD_0 \sim PD_5$ are disposed so that each of them receives a light incident on a different portion of a photographing image plane. The ranges in which light are measured by the respective photodiodes $PD_0 \sim PD_5$ are as shown in FIG. 2. That is, the photodiode $PD_0$ is disposed to receive a light incident on a circular portion 1 located in the center of a photographing image plane FLM; the photodiode $PD_1$ to receive a light incident on a "C"-shaped portion 2 located on the left hand of the circular portion 1; the photodiode $PD_2$ to receive a light incident on a "C"-shaped portion 3 located on the right hand of the circular portion 1; the photodiode $PD_3$ to receive a light incident on a "C"-shaped portion 4 located on the upper hand of the circular portion 1; the photodiode $PD_4$ to receive a light incident on a "C"-shaped portion 5 located on the lower hand of the circular portion 1; and the photodiode $PD_5$ to receive a light incident on a portion 6 of a rectangular range LMR in which a light is measured excluding the above-described portions 1 through 5.

As apparent from FIG. 1, the anodes of all the photodiodes $PD_0 \sim PD_5$ are grounded.

The light measuring interface LIF provided with an A-D converter converts the analog data of the output from the light measuring circuit LMA to a digital data, thus outputting a digitized signal to the microcomputer MCB.

The display circuit DSP displays various photographic information such as an aperture value, a shutter speed, and an exposure control mode, reads the ISO sensitivity of a film according to the relationship between a film cartridge and contacts CAS, and transfers the data of the film sensitivity to the microcomputer MCB. The display circuit DSP has an individual microcomputer. A reference clock generating circuit $X_1$ generates a reference clock of the microcomputer of the display circuit DSP.

The lens circuit LEC provided for respective photographing lenses outputs information thereof, for example, focal lengths, minimum aperture values.

The AF interface AIF receives a control signal from the microcomputer MCB through a data bus ADB. Based on the control signal, the AF interface AIF controls the operation of a light receiving circuit AFD, for detecting focusing condition, including CCD line sensors, through a signal line AFS. The AF interface AIF receives the analog data of the respective pixels or picture elements of the CCD line sensors through the signal line AFS, then converts the analogue data into a digital data which is outputted to the microcomputer MCB through the data bus ADB. The light receiving circuit AFD for detecting focusing condition has three CCD line sensors $ISL_0$, $ISL_1$, and $ISL_2$ which are used to detect the focusing conditions of objects located at positions corresponding to the regions shown by broken lines in FIG. 2. More specifically, the CCD line sensor $ISL_0$ is used to horizontally detect the focusing condition of an object disposed at the center portion (zero zone) of the photographing image plane FLM. The CCD line sensor $ISL_1$ is used to vertically detect the focusing condition of the object disposed on the left hand (first zone) of the center thereof. The CCD line sensor $ISL_2$ is used to vertically detect the focusing condition of the object disposed on the right hand (second zone) of the center thereof. Upon completions of the CCD integrations of the CCD line sensors $ISL_0$, $ISL_1$, and $ISL_2$, the AF interface AIF outputs an integration completion signal $\overline{AFFN}$ of an "L" level to an interruption terminal $\overline{INT}_1$. Thus the microcomputer MCB is enabled for an interruption. It is to be noted that, contrary to the above as shown in FIG. 2, the first and second zones may be respectively designed so as to horizontally detect the focusing condition of the object or to obliquely detect the same. Further, one of the first and second zones may detects horizontally, while the other may detect vertically them.

A DC-to-DC converter VG boosts the voltage of a battery BA for a direct current power source, thus supplying the respective circuits with two kinds of voltages HV and LV (HV>LV). The higher voltage HV is supplied to the AF interface AIF and the light receiving circuit AFD. The lower voltage LV is supplied to the light measuring interface LIF, the light measuring circuit LMA, the lens circuit LEC, the drive circuit DDR, and encoders ENAP and ENLE. The battery BA powers the microcomputer MCB, the display circuit DSP, and the motor control circuit MOD through a power source feeding line VDD.

Next, switches are described hereinbelow.

A light measuring switch $S_1$ is turned on when an unshown release button is pressed to a first stroke (a first press). When the light measuring switch $S_1$ is turned on, a light measuring and the detection of a focusing condition are started by the microcomputer MCB.

When an unshown release button is depressed to a second stroke (by a second press), a release switch $S_2$ is turned on. Accordingly, when the release switch $S_2$ is ON, the light measuring switch $S_1$ is also ON. When the switch $S_2$ is turned on, an exposure control operation is started by the microcomputer MCB. A photograph completion detection switch $S_4$ is turned on when a mirror (unshown) pivots downwards, the aperture (unshown) fully opens, and a second shutter curtain (unshown) completes its movement upon completion of an exposure, and thereafter, turned off when every one frame of a film is wound and the shutter, mirror, and diaphragming mechanism are cocked. When a focus detecting region selecting switch AFS is turned on, the focusing condition as to only the zero zone is detected, that is, the spot mode is selected, while the switch AFS is turned off, the focusing conditions as to all of the zero, first and second zones are detected, that is, the wide mode is selected.

As shown in FIG. 1, one end of each of these switches are grounded and the other end of the light measuring switch $S_1$ is connected to an interruption terminal $\overline{INT_0}$. Accordingly, the microcomputer MCB starts an interrupt operation when the light measuring switch $S_1$ is turned on.

Although not shown, each of the ungrounded terminals of these switches is pulled up by the voltage of the battery BA (VDD), and needless to say, a chattering eliminator is provided for these switches.

The microcomputer MCB outputs control data to the drive circuit DDR through the data bus DDB. The control data are decoded to control four magnets RLM, APM, 1CM, and 2CM, and motor control data is outputted from the drive circuit DDR to a motor control circuit MOD. When the attracting portions of release magnets RLM repel each other, a diaphragming member and the mirror are disengaged from an engaging member, and then, the diaphragming member starts an aperture size reducing operation and the mirror pivots upwards, while the diaphragm member stops the diaphragming operation when the attracting portions of diaphragming magnets APM repel each other. When the attracting portions of the magnets 1CM and 2CM for traveling shutters repel each other, respectively, the first shutter curtain (unshown) and the second shutter curtain are disengaged from engaging members such as springs and start traveling. When electric current flows through the coils of the release magnet RLM, the magnet APM, the magnets 1CM and 2CM comprising permanent magnets, coils, and attracting portions, respectively, the attracting portions thereof repel each other.

The motor control circuit MOD controls the clockwise and counterclockwise rotations of a film sending motor MOFI and a lens drive motor MOL in response to the data transmitted from the drive circuit DDR.

The encoder ENAP detects the position of the diaphragm, while the encoder ENLE detects the rotation amount of the lens drive motor MOL, namely, the movement amount of the lenses. The output pulses of the encoders ENAP and ENLE are inputted to the count terminal CNT of the microcomputer MCB through a multiplexer comprising AND circuits $AN_3$ and $AN_4$ and an OR circuit $OR_2$.

A reference clock generating circuit XB comprises a crystal oscillator and a capacitor. A reference clock STCK outputted from the reference clock output terminal STCK of the microcomputer MCB is applied both to the light measuring interface LIF and the AF interface AIF.

Terminal of microcomputer

The functions of the terminals of the microcomputers MCB (input and output signals and data and the operation of the camera system) are listed in Table 1 attached to the last part of this detailed description.

Software

The control to be performed by the camera system in this embodiment is described hereinbelow.

Flag

Table 2 attached to the last part of this detailed description shows flags to be used in this system and the contents which the flags signify. The upper stages of Table 2 indicate the states at the time when the flags are set and the lower stages thereof show the states a the time when the flags are reset.

Data

Table 3 attached to the last part of this detailed description shows the display data to be transferred to the display circuit DSP and the contents of the data. In response to the data transferred from the microcomputer MCB, the display circuit DSP stores the data in the memory (RAM) provided therein, and displays the information indicated by the data by means of a liquid crystal display, an LED, and so on. Supposing that the content of the data AFD is "01", the microcomputer provided in the display circuit DSP actuates the LED provided in a finder (not shown), whereby the photographer knows that an in focus condition has been obtained. On the other hand, if the content of the data AFD is "10", the microcomputer provided in the display circuit DSP flashes the LED, whereby the photographer knows that it is impossible to detect focusing condition. Data AVD showing a control aperture value Avs and data CND indicating the number of exposed frames of a film are indicated by numerals by the liquid crystal display atop the camera body. The information on display data AFD, AVD, FLD, and TVD are displayed in the finder. The information on display data AVD, CND, SVD, and TVD are displayed atop the camera.

Flowchart

FIGS. 3 through 14 are flowcharts showing the operation (operation of the microcomputer MCB) of the camera system of the embodiment.

Interruption $INT_0$

Figure 3:
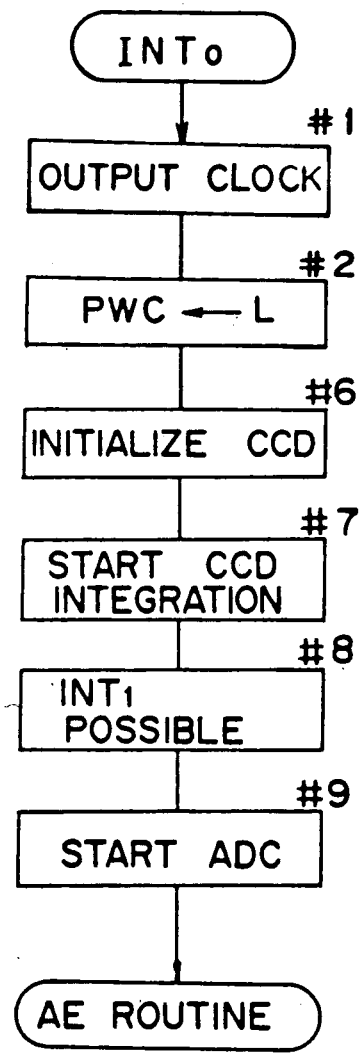
FIG. 3 through FIG. 14 are flowcharts showing the control to be performed by a microcomputer provided in the camera of a camera system which embodies the present invention.

When the light measuring switches $S_1$ is turned on, the voltage level of the interruption terminal $\overline{INT_0}$ becomes low and in synchronization of the fall of the signal level, the microcomputer MCB starts its operation in accordance with the flowchart shown in FIG. 3.

First, at step #1, the microcomputer MCB actuates the reference clock generating circuit XB so that the reference clock STCK is outputted from the reference clock outputting terminal STCK. At step #2, the signal level of the power control terminal $P_5$ is set to "L" to operate the DC-to-DC converter circuit VG. Subsequently, at step #6, the CCD line sensor provided in the light receiving circuit AFD for detecting focusing condition is initialized. At step #7, CCD integrations is started and at step #8, an interruption $INT_1$ which occurs when the CCD integration has been completed is allowed. Thereafter, at step #9, the terminal $P_0$ is set to "L" so as to output the light measuring start signal LSTA, to operate the A-D converter provided in the light measuring interface LIF so that the A-D conversion operation is started, then the program goes to step AE routine.

AE routine

Figure 4:
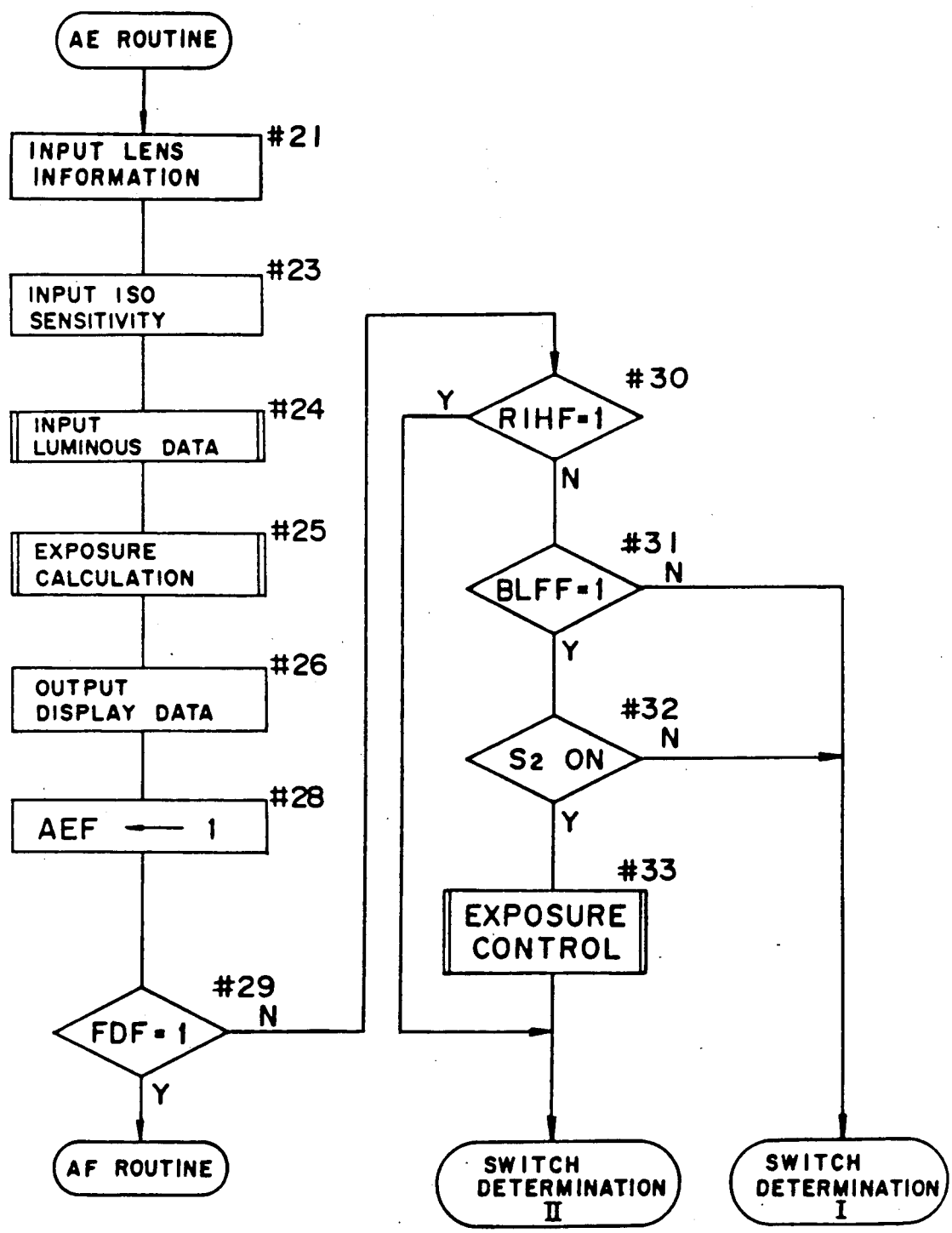

FIG. 4 is a flowchart showing the control to be executed in the AE routine. In this routine, through the serial data bus SDB, at step #21, lens information is inputted from the lens circuit LEC to the microcomputer MCB, and at step #23, an ISO sensitivity is inputted from the display circuit DSP thereto. Thereafter, at step #24, data of lights measured by the photodiodes $PD_0$ through $PD_5$ are inputted from the light measuring circuit LMA to the microcomputer MCB through the light measuring interface LIF and the serial data bus SDB. At step #25, an exposure calculation is performed using the above-described data. A subroutine of step #24 (input luminous data) and a subroutine of step #25 (exposure calculation) are described later (refer to FIGS. 11 through 13).

After the exposure calculation is completed, at step #26, the display data shown in Table 3 are outputted to the display circuit DSP through the serial data bus SDB so as to display various photographing data. Then, at step #28, the flag AEF is set. Thereafter, the program goes to step #29.

It is detected at step #29 whether or not an automatic focusing operation (hereinafter referred to as AF operation) is completed. If the flag FDF is set, it is decided that the AF operation has not been completed, so that the program goes to the AF routine. If the flag FDF is reset, it is decided that the AF operation has been completed, then the program goes to step #30. The AF routine is described in detail (refer to FIG. 8).

Figure 6:
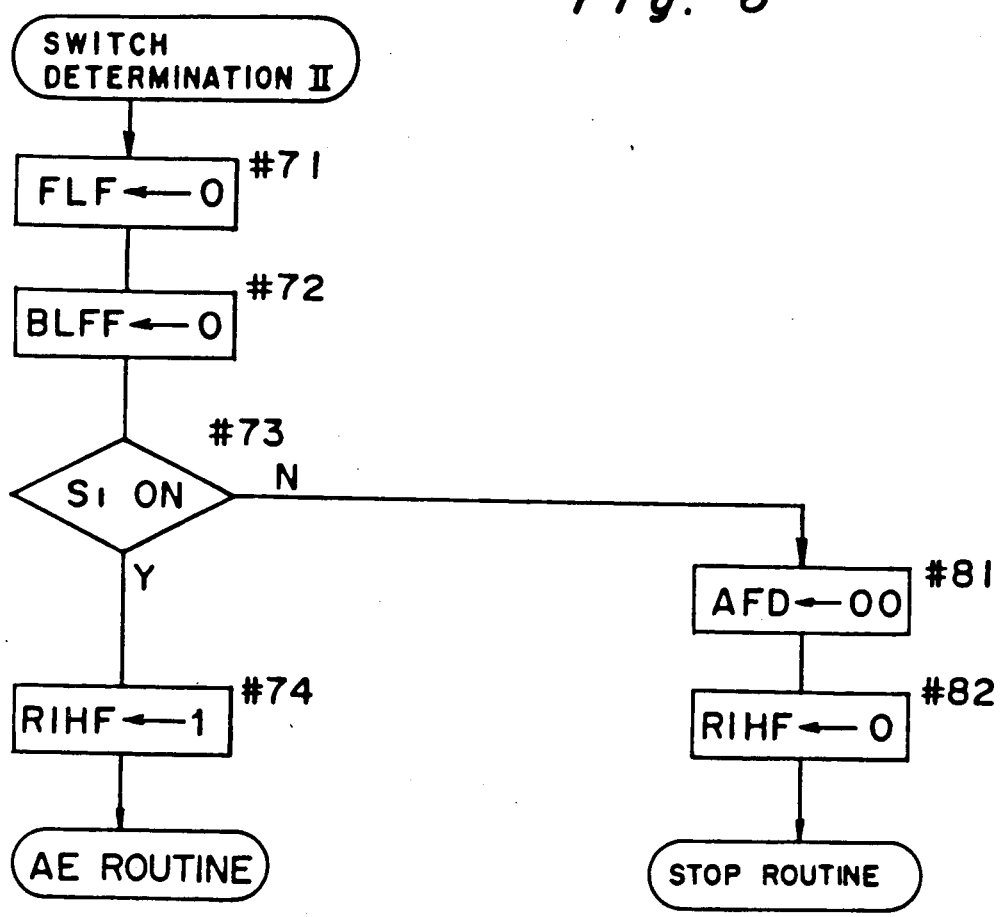

At step #30, it is detected whether or not a shutter release is prohibited. If the release prohibiting flag RIHF is set, it is decided that the shutter release is prohibited, so that the program goes to the switch determining routine II (FIG. 6). If the flag RIHF is reset, it is decided that the shutter release is allowed, so that the program goes to step #31.

It is detected at step #31 whether or not the AE lock is effected in response to that the focusing condition is obtained, which is described later. If the flag BLFF is set, it is decided that the AE lock is effected in response to that the focusing condition is obtained, then the program goes to step #32. If the flag BLFF is not set, the program goes to the switch determining routine I (FIG. 5).

It is detected at step #32 whether or not the shutter release is carried out. If the terminal $P_{12}$ is "L", it is decided that the release button is pressed to the second stroke, i.e., the switch $S_2$ is turned on, so that the program goes to the subroutine "exposure control" (step #33, refer to FIG. 14). When a photographing has been completed, the program goes to the switch determining routine II (FIG. 6). If the terminal $P_{12}$ is "H" at step #32, it is decided that the release button has not yet pressed (switch $S_2$ is OFF), so that the program goes to the switch determining routine I (FIG. 5).

Switch Determining Routine I

Figure 5:
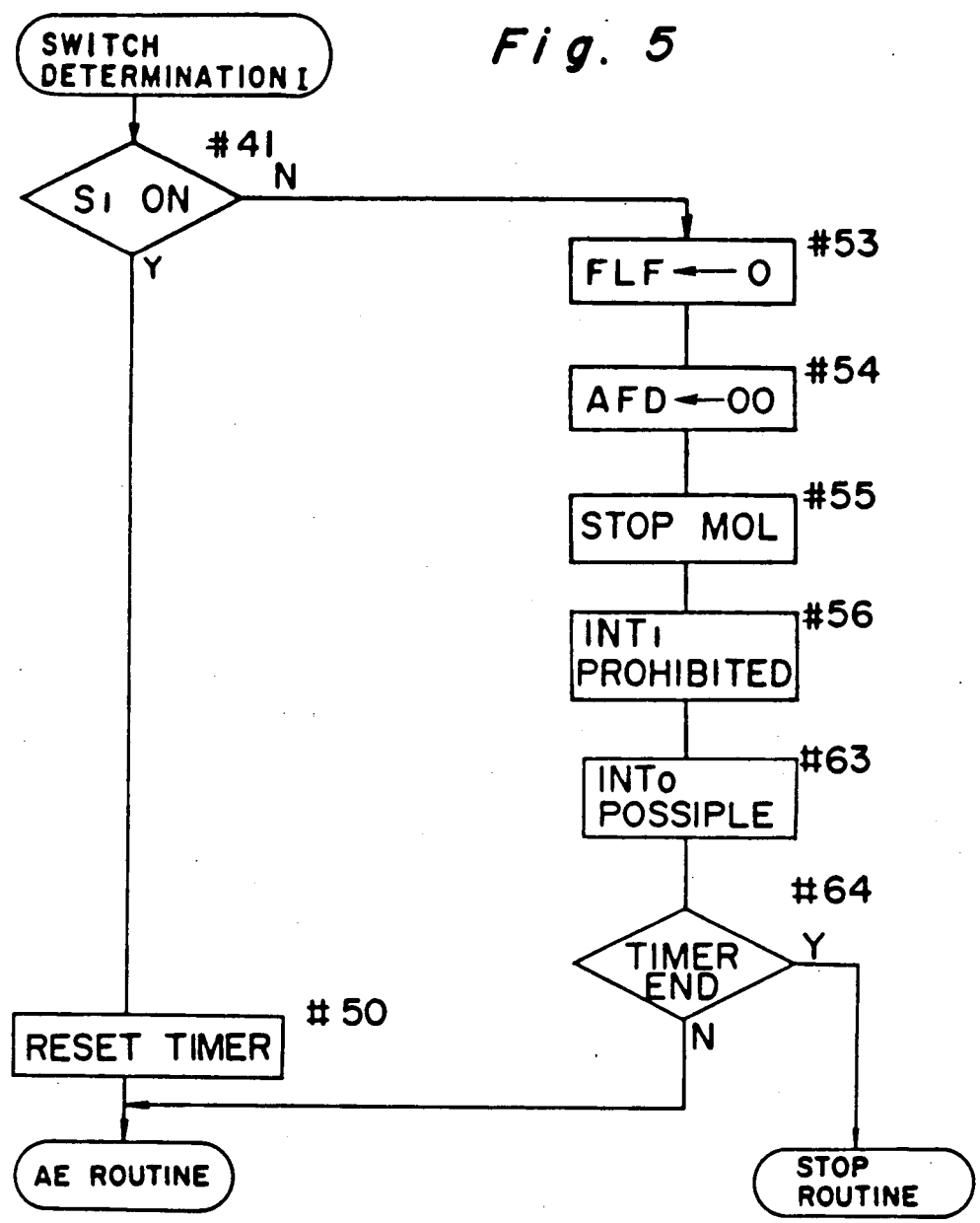

FIG. 5 is a flowchart showing the switch determining routine I. In this routine, first, at step #41, it is detected whether or not the light measuring switch S1 is turned on. If the terminal $P_6$ is "L", it is decided that the switch $S_1$ is ON, then the program goes to step #50. If the terminal $P_6$ is "H", it is decided that the switch $S_1$ is OFF, then the program goes to step #53. At step #50, a timer is reset to start its operation and the program returns to the AE routine (FIG. 4). A light measuring operation, an exposure calculation, and the input/output and indication of data are kept performed until the timer counts a predetermined period (for example, 10 seconds) after the switch $S_1$ is turned off.

Figure 7:
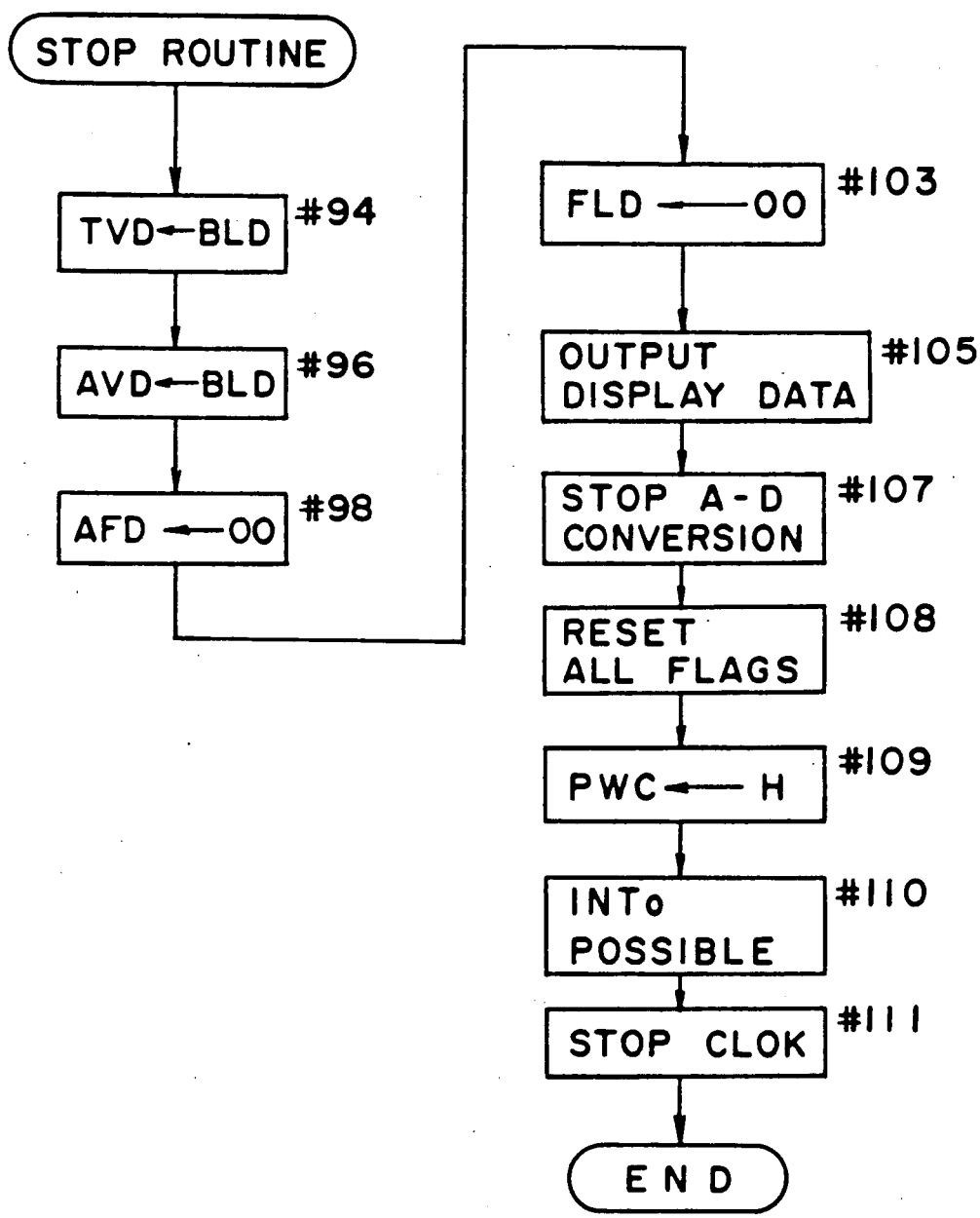

If the light measuring switch $S_1$ is off at step #41, a flag FLF is reset at step #53. Thereafter, at step #54, "00" is stored in the data AFD so that the indication showing the focusing condition is cleared. At step #55, the lens drive motor MOL is stopped and the interruption $INT_1$ caused by the completion of the CCD integrations is disabled at step #56. Accordingly, if the measuring switch $S_1$ is off, a focusing condition detecting operation is not performed. Thereafter, at step #63, the interruption $INT_0$ caused by the operations of the switch $S_1$ is allowed. Thereafter, the program goes to step #64. At step #64, as described above, it is detected whether or not the timer has counted the predetermined period (approximately 10 seconds). If the timer has not counted the predetermined period, the program returns to the AE routine s that a light measuring operation, an exposure calculation, and the input/output and indication of data are performed. If the timer has counted the predetermined period, the program goes to the STOP routine (FIG. 7). Then, the microcomputer MCB stops its operation until the interruption $INT_0$ occurs again.

SWITCH DETERMINING ROUTINE

FIG. 6 is a flowchart showing the switch determining routine II. As apparent from the AE routine shown in FIG. 4, the microcomputer MCB processes the execution of this routine either when the exposure control is effected by the press of the release button to the second stroke (from step #32 to step #33) or the shutter release is prohibited at step #30.

First, the flag FLF and the flag BLFF are reset at steps #71 and #72, then it is detected at step #73 whether the light measuring switch $S_1$ is ON or OFF. If the terminal $P_6$ is "L", it is decided that the switch $S_1$ is ON. Then, the program goes to step #74. At step #74, the release prohibiting flag RIHF is set to prohibit subsequent shutter release operations, whereby even though the release button is erroneously kept pressed, a photographing operation is not performed, i.e., films are not wasted. Thereafter, the program returns to the AE routine (FIG. 4).

At step #73, if the terminal $P_6$ is "H", it is decided that the light measuring switch $S_1$ is OFF, then, at step #81, "00" is stored in the data AFD to clear the indication showing the focusing condition. Then, the release prohibiting flag RIHF is reset at step #82, and subsequent shutter release operations are allowed, and then the program goes to the STOP routine (FIG. 7).

STOP ROUTINE

FIG. 7 is a flowchart showing the STOP routine.
In this routine, at step #94, a blank indication data BLD is stored in an indication data TVD to clear the indication of the control exposure time Tv. Thereafter, the blank indication data BLD is stored in the indication data AVD to clear the indication of the control aperture value Av. Thereafter, at step #98, "00" is stored in the indication data AFD to clear tee indication of the focusing condition. Thereafter, at step #103, "00" is stored in the indication data FLD to clear the indications of all the flash information. Thereafter, at step #105, the microcomputer MCB outputs the indication data to the display circuit DSP through the serial data bus SDB.

Thereafter, at step #107, an "H" level signal is outputted (hereinafter referred to as "H" or "L" is outputted) from the terminal $P_0$ so as to clear the A-D conversion start signal LSTA, and to stop the operation of the A-D converter provided in the light measuring interface LIF. After all the flags are reset at step #108, "H" is outputted, at step #109, from the power control terminal $P_5$ to stop the operation of the DC-to-DC converter VG, which stops the operations of the AF interface AIF, the light receiving circuit AFD for detecting focusing condition, the light measuring interface LIF, the light measuring circuit LMA, the lens circuit LEC, the drive circuit DDR, and the encoders ENAP and the ENLE. Thereafter, at step #110, the microcomputer MCB allows the interruption $INT_0$, and at step #111, the output of the reference clock STCK and the operation of the reference clock generating circuit XB are stopped. Then, the microcomputer MCB waits until the interruption $INT_0$ is caused again by the switch $S_1$.

Interruption $INT_1$

Figure 8:
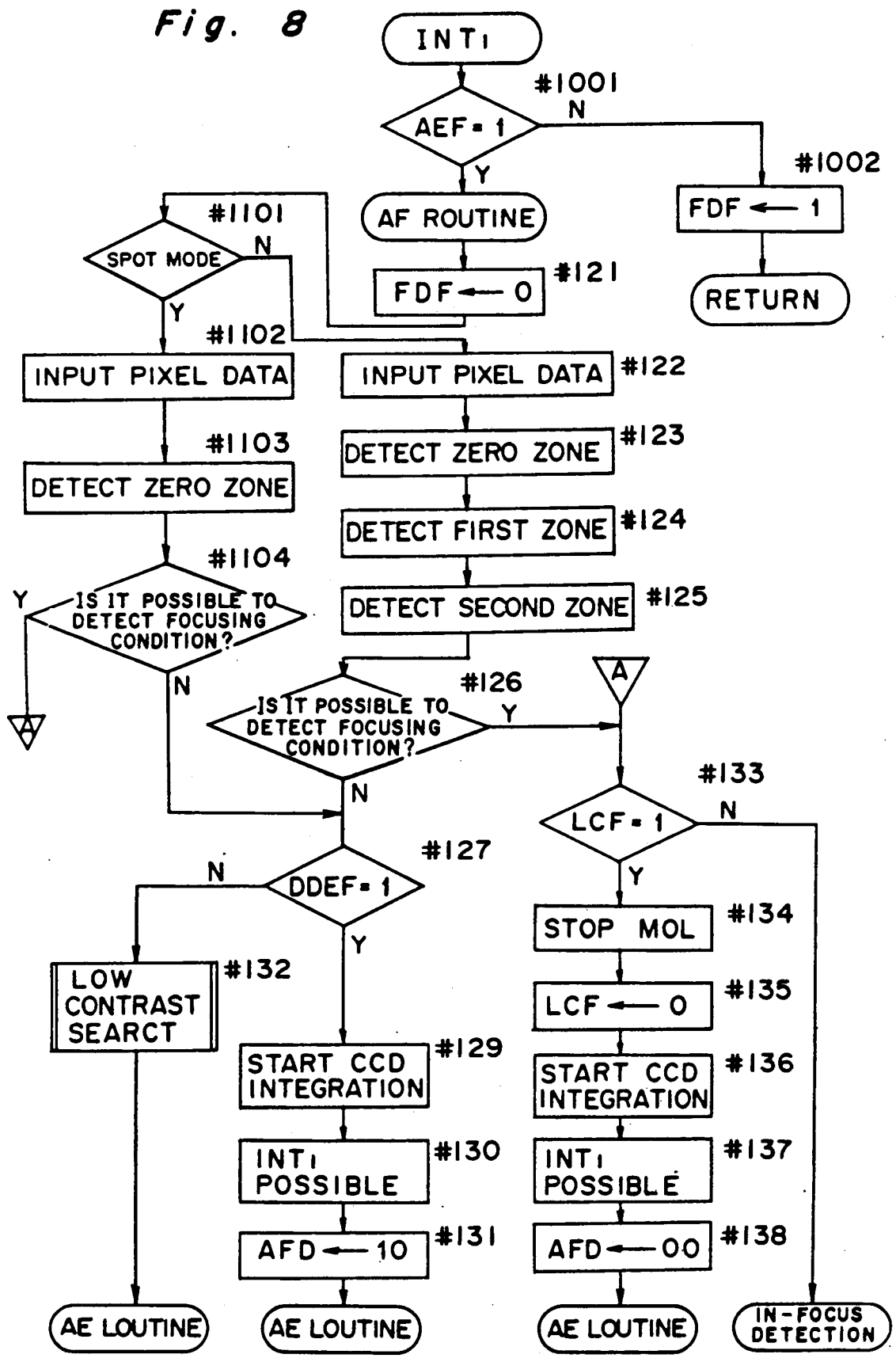

FIG. 8 is a flowchart showing the processing to be executed after the interruption $INT_1$ occurs due to the completions of the CCD integrations of the line sensors $ISL_0$, $ISL_1$, $ISL_2$ provided in the light receiving circuit AFD for detecting focusing condition.

As previously described, upon completions of the CCD integrations of the line sensors $ISL_0$, $ISL_1$, $ISL_2$, the AF interface AIF outputs an "L" level signal indicating the completions of the integrations to the terminal $\overline{INT_1}$ of the microcomputer MCB, whereby the microcomputer MCB operates according to the flowchart shown in FIG. 8.

First, at step #1001, it is detected whether or not an exposure calculation is completed. If the flag AEF is set, it is decided that the exposure calculation is completed, then the program goes to step #121 (AF routine). If the flag AEF is reset, it is decided that the exposure calculation has not yet been completed, then the program goes to step #1002. At step #1002, the flag FDF is set and then the program returns to the step at which the processing is executed when the interruption $INT_1$ occurs. This is to perform the operation for an exposure control and make a data indication. After light measuring, calculations, indication operations are performed, the program immediately returns to the AF routine (see step #29 in FIG. 4).

AF ROUTINE

Next, the AF routine is described hereinbelow.

First, the flag FDF is reset at step #121.

Thereafter, at step #1101, the focus detecting region, i.e. spot mode or wide mode, is examined. If the terminal $P_{16}$ is "H", it is decided that the focus detecting region corresponds to the wide mode, and the program goes to step #122. Meanwhile, if the terminal is "L", it is decided that the focus detecting region corresponds to the spot mode, and the program goes to step #1102. At step 1101, the minimum (open) aperture value of the taking lens in use, which is read out from the lens circuit LEC at step #21 (FIG. 4), is detect, and if the value is larger than the predetermined value, for example APEX value: 4, that is the open aperture size is smaller than the predetermined aperture size, it is decided that the focus detecting region corresponds to the spot mode regardless of the condition of the terminal $P_{16}$, and the program goes to step #1102. This is because that, if a taking lens having relatively small open aperture size is used, an eclipse is caused at the periphery of the lens and accordingly accurate focus detection thereof is not ensured. Therefore, according to this camera system, when a taking lens having a relatively small aperture is used, the spot mode is always set.

At step #122, i.e. wide mode, the data of the pixels of the CCD line sensors $ISL_0$, $ISL_1$, and $ISL_2$ are inputted to the microcomputer MCB. Based on these data, the detection of the focusing conditions, the detection of a defocus direction, and the calculation of the defocus amount in the zero zone, the first zone, and the second zone are performed at steps #123, #124, and #125. Then it is examined at step #126 whether or not it is possible to detect focusing condition. If the detection of the focusing condition is possible in at least one of the three zones, the program goes to step #133. If it is impossible to detect the focusing condition in any one of the three zones, the program goes to step #127.

Meanwhile, when, at step #1101, it is decided that the focus detecting region corresponds to the spot mode or it is detected that the minimum aperture value of the taking lens in use is larger than the predetermined value, that is the open aperture size of is smaller than the predetermined size (spot mode), the program goes to step #1102 where the data of the pixels of the CCD line sensor $ISL_0$ are inputted to the microcomputer MCB. Based on these data, the detection of the focusing conditions, the detection of a defocus direction, and the calculation of the defocus amount in the zero zone are performed at step #1103. Then it is examined at step #1104 whether or not it is possible to detect focusing condition. If the detection of the focusing condition is possible in the zero zone, the program goes to step #133. If it is impossible to detect the focusing condition in the zero zone, the program goes to step #127. It is to be noted, in this case, that the data of the pixels of the other CCD line sensors $ISL_1$ and $ISL_2$ are not inputted to the microcomputer MCB.

At step #127, it is detected whether or not a low contrast search has been effected. If the flag DDEF is reset, it is decided that the low contrast search has not been carried out. Then, the program goes to step #132 so as to carry out a low contrast search. On the other hand, if the flag DDEF is set, it is decided that the low contrast search is completed. Then, the program goes to step #129. At step #129, the CCD integrations are resumed, and the interruption $INT_1$ is allowed at step #130. Then at step #131, "10" is stored in the indication data AFD to warn the photographer that it is impossible to detect focusing condition. Then, the program goes to AE routine (FIG. 5). Accordingly, once the low contrast search is made, no low contrast searches are performed any more. When the low contrast search is carried out at step #132, the program goes to the AE routine when the low contrast search has been completed.

Figure 10:
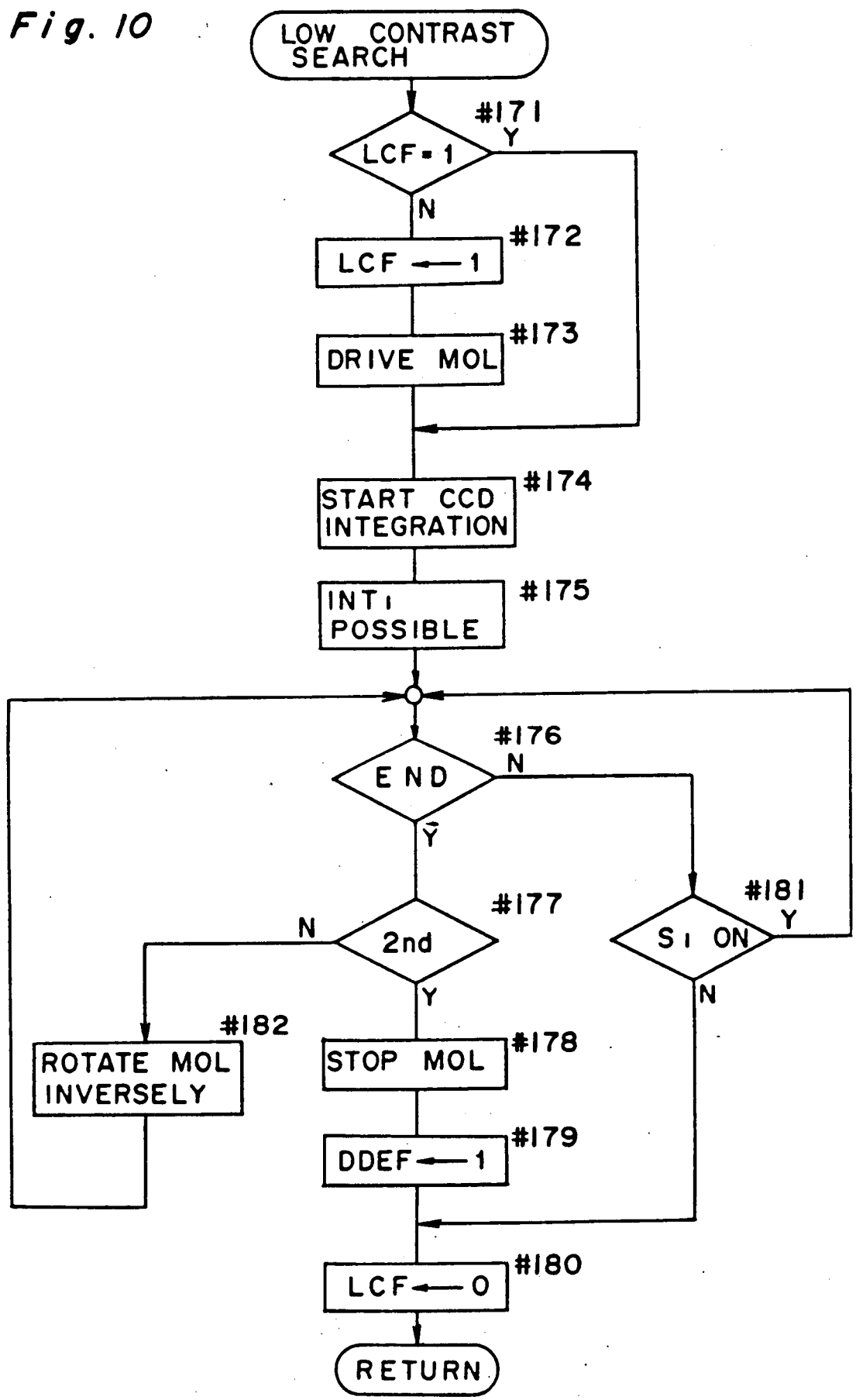

At step #126, if the program goes to step #133 because there is a zone where focusing condition can be detected o because the focusing condition can be detected in the zero zone, it is detected whether or not the low contrast search is being performed. If the low contrast flag LCF is reset, it is decided that the low contrast search is not being performed, so that the program goes to the in-focus detection routine (FIG. 10). If the flag LCF is set at step #133, it is decided that the low contrast search is being performed. Then, the program goes to step #134.

At step #134, the lens drive motor MOL is stopped, and the low contrast flag LCF is reset at step #135. As described later, the lens is moving during the low contrast search. Therefore, when the lens drive motor MOL is stopped at step #134, the focusing condition, the defocus direction, and defocus amount found according to the pixels of the CCD line sensors $ISL_0$, $ISL_1$, $ISL_2$ do not correspond to the actual lens position, so that the above-described data are not reliable. Therefore, at step #136, the CCD integrations are resumed with the lens position fixed and the interruption $INT_1$ is allowed at step #137. Then, the program goes to the AE routine so that the pixel data outputted from the CCD line sensors can be obtained. If a warning indicating that a focusing condition cannot be detected is indicated, at step #138, "00" is stored in the indication data AFD to clear the warning indication. Then, the program goes to the AE routine (FIG. 4).

IN-FOCUS DETECTION AND INTERRUPTION CNT

Figure 9:
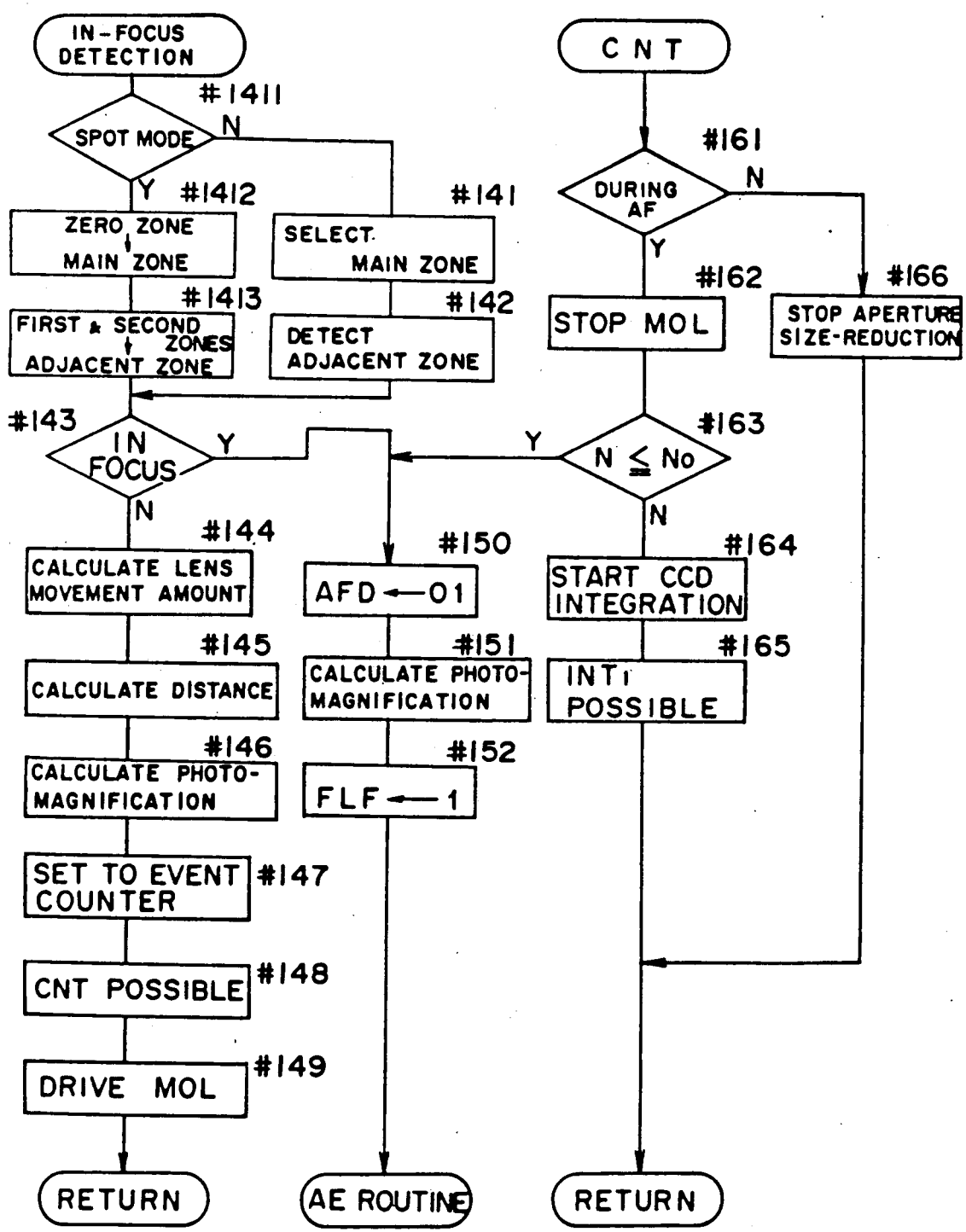

FIG. 9 is a flowchart showing the in-focus detection routine and the processing to be executed when the counter interruption CNT occurs. In the in-focus detection routine, focusing condition detecting operations and in-focus determining operations are performed.

When the program goes to the in-focus detection routine, the focus detecting region is examined, at step #141. If it is the wide mode, a zone for focusing (hereinafter referred to as main zone) is selected from the zero through the second zone. In principle, a zone in which an object nearest the photographing lens is disposed (a zone in which the amount of a rear focus is maximum) is selected as the main zone. Needless to say, if there is only one zone where focusing condition can be detected, the zone is adopted as the main zone. The method for selecting a zone is disclosed in U.S. Patent application Ser. No. 196,254 the present applicant have filed on May 20, 1988.

Thereafter, it is detected at step #142 whether or not zones except the main zone are adjacent zones. That is, it is detected whether or not there are objects (hereinafter referred to as adjacent object) which are close to the object (hereinafter referred to as main object) located in the main zone selected at step #141. The adjacent object herein means in principle the same object as the main object. If the defocus amount of an object with respect to the main object is less than a predetermined value (80 μm in this embodiment), it is decided that the object is an adjacent object. The zone in which the adjacent object is located is hereinafter referred to as a adjacent zone.

Specifically, in a portrait (photographing magnification $\beta = 1/10$) in which a face is photographed as large as possible, when the difference of photographing distance between two objects is less than 2 cm (about the height of the nose), it is decided that the objects are adjacent objects. In a portrait ($\beta = \frac{1}{4}$) in which a person is photographed widthwise from his face to waist, when the difference of photographing distance between two objects is less than 14 cm (about the height between the top of the nose and the ear), it is decided that the objects are adjacent objects. In a photograph (photographing magnification $\beta = 1/100$ in which several persons are photographed, when the difference of photographing distance between two objects is less than 95 cm (about depth between a person's face in the front row and a person's face in the rear row), it is decided that objects located in this range are adjacent objects.

Meanwhile, at step #1411, when the terminal $P_{16}$ is "L" or the minimum aperture value of the taking lens in use is greater than the predetermined value, that is, it is the spot mode, the zero zone is selected as the main zone at step #1412 and the first and second zones are regarded as the adjacent zones at step #1413.

The microcomputer MCB stores the data of the main zone and the adjacent zone (s), and as described later, selects a light measuring calculation based on these data.

Next, as step #143, it is decided whether or not the object image located within the main zone selected at step #141 or #1412 is in focus. If the object image is not in focus, at step #144, a lens movement amount is calculated according to the defocus amount. Thereafter, the photographing distance (D) as well as the photographing magnification $\beta$ are calculated at steps #145 and #146.

The method for calculating the photographing distance (D) and the photographing magnification $\beta$ are described hereinbelow.

Assuming that the lens drive amount is N and the defocus amount is DF, the following relationship is established.

$$N = K \cdot DF \quad (1)$$

where K is a constant called a conversion coefficient, which varies depending on lenses. The conversion coefficient (K) is outputted from the lens drive circuit LEC to the microcomputer MCB. The conversion coefficient (K) is described in detail, for example, in U.S. Pat. No. 4,509,842. The photographing distance $D_0$ is expressed as follows, which is well known.

$$D_0 = k/n_0 \quad (2)$$

$$k = a \cdot f^2 \quad (3)$$

$n_0$: lens movement amount from a position in which a lens is focused on the infinite point
f: focal length of lens
a: constant The constant (k) and the focal length (f) of the lens are inputted from the lens circuit LEC to the microcomputer MCG. Accordingly, assuming that the photographing distance calculated when a focusing condition is detected is $D_1$, its apex value is $Dv_1$ (inputted from the lens circuit LEC), and the lens movement amount from the position in which the lens is focused on the infinite point to the present position is $n_1$, the following relationship is established:

$$Dv_1 = 2 log_2 D_1 \quad (4)$$

$$D_1 = k/n_1 \quad (5)$$

The lens movement amount to focus is expressed by the equation (1). Accordingly the lens movement amount $n_2$ from the position at which the lens is focused on the infinite point to the in-focus position is expressed as follows:

$$n_2 = n_1 \pm N \tag{6}$$

where (+) of (±) means a front focus and (−) means a rear focus. Accordingly, the photographing distance (D) at the in-focus position, namely, the photographing distance (D) of the main object is expressed as follows form the equation (2):

$$D = k/n_2 \tag{7}$$

The apex value Dv is expressed as follows similarly to the equation (4):

$$Dv = 2\log_2 D \tag{8}$$

The photographing magnification $\beta$ can be found from the following equation:

$$\beta = f/D \tag{9}$$

Thereafter, the pulse number (N) corresponding to the lens movement amount found at step #144 is set to an event counter at step #147 and the counter interruption CNT is allowed at step #148. As described later, since "L" is outputted from the terminal $P_{15}$, the pulse outputted from the encoder ENLE can be inputted to the terminal CNT. The microcomputer MCB transmits data to the drive circuit DDR at step #149, the circuit DDR drives the lens drive motor MOL to drive the lens. Thereafter, the program returns to the step at which the interruption $INT_1$ occurs. If it is decided at step #29 in the AE routine (FIG. 4) that the AF operation has not been completed and then the program goes to AF routine, the program returns to the AE routine, and the processings are executed from step #21.

In a camera system in which only the constant (k) is inputted from the lens circuit LEC and the photographing distance Dv at the time when focus condition is detected is not inputted, as describe din Japanese Patent Laid-Open Publication No. 150921/1983, a counter for monitoring the lens movement amount from the position at which the lens is focused on the infinite point to the present position may be provided so that the lens movement amount $n_2 = n_1 \pm N$ (where $n_1$ means the present count value of the counter) from a position at which the lens is focused on the infinite point to the in-focus position is found and the photographing distance (D) of the main object is found based on the lens drive amount $n_2$.

When it is decided at step #143 that an object image located int he main zone is focused, i.e., when it is decided that the defocus amount of an object located in the main zone is less than a predetermined value (for example, 30 μm), the program goes to step #150, and "01" is stored in the indication data AFD to make the display circuit DSP display that the in-focus condition is obtained. Thereafter, the microcomputer MCB calculates at step #151 the photographing magnification $\beta$ based on the distance information (D) outputted form the lens circuit LEC when focusing condition is detected (or the distance information $D_1$ calculated according to the lens movement amount $n_1$ from the position at which the lens is focused on the infinite point to the position where focusing condition is detected and the constant (k)) and the information of the focal length (f). Then, the focus lock flag FLF is set at step #152, and the program goes to AE routine (FIG. 5). Therefore, if an in-focus condition is obtained, the CCD integrations are not performed any longer and microcomputer MCB does not allow the interruption $INT_1$. Thereafter, the program goes to AE routine.

Next, the counter interruption CNT is described hereinbelow.

When the number of pulses, inputted to the terminal CNT, counted by the event counter provided in the microcomputer MCB has reached the number which is set at step #147 or #454, the event counter causes an interruption CNT, whereby processings are executed from step #161. First, it is decided whether the interruption CNT is caused during the stopping down or while the AF operation is being carried out. That is, it is detected whether the pulse inputted to the terminal CNT is outputted from the encoder ENAP or the encoder ENLE.

If the terminal $P_{15}$ is "H", it is decided that the pulse is outputted from the encoder ENAP, i.e., the stopping down operation is being performed, then the program goes to step #166 at which data is transferred to the drive circuit DDR so that the magnets APM are repelled, whereby the stopping down operation is stopped. Then, the program returns to the step (usually step #457 in FIG. 14) at which the processing is executed when the interruption CNT occurs.

If the terminal $P_{15}$ is "L", it is decided that the pulse is outputted from the encoder ENLE, that is, it is decided that the AF operation is being performed. Then the program goes to step #162 at which data is transferred to the drive circuit DDR to stop the lens drive motor MOL. Thereafter, the program goes to step #163.

It is decided at step #163 whether or not the lens movement amount (N) is greater than the predetermined value $N_0$. If the movement amount (N) is great, it means that when a defocus amount is calculated at step #144, the defocus amount is great, which causes an image to be blurred. Accordingly, there is a possibility that the defocus amount measured in this case includes an error, so that this amount is not reliable. In order to overcome this problem, according to the embodiment, if the lens movement amount (N) is greater than the predetermined value $N_0$, the CCD integrations are resumed at step #164 and the interruption $INT_1$ is enabled at step #165 so that it is confirmed whether or not in-focus condition is obtained, whereby the AF accuracy can be improved. After the interruption $INT_1$ is allowed at step #165, the program returns to the step at which the processing of the interruption CNT occurs.

If it is decided at step #163 that the lens movement amount (N) is less than or equal to the predetermined value $N_0$, the program goes to step #150 without checking the focusing condition by deciding that there is no error in the calculated defocus amount, namely, reliable, and then above-described processings (step #150 through #152) are performed. Then, the program goes to the AE routine (FIG. 4).

As previously described, when the in-focus condition is obtained, the program goes to the AE routine without performing the CCD integrations and allowing the interruption $INT_1$. Therefore, the program no longer goes to the AF routine (FIG. 8). That is, once the in-focus condition is obtained, the AF operation is not performed until the interruption $INT_1$ is allowed at step #8 after the interruption $INT_0$ occurs with the light measuring switch $S_1$ turned off, then turned on, and the CCD integrations are started at step #7. In other words, a so-called focus lock is effected with the light measuring switch $S_1$ being ON. That is, according to the camera system of the embodiment, a one-shot AF operation is accomplished.

Low Contrast Search

FIG. 10 is a flowchart showing the subroutine "low contrast search". In this subroutine, it is decided at step #171 whether or not a low contrast search is being executed. If the low contrast flag LCF is reset, it is decided that the low contrast search has not been carried out, then the program goes to step #172. Thereafter, the flag LCF is set, then data is outputted to the drive circuit DDR to drive the lens drive motor MOL, whereby the low contrast search operation is started at step #173. On the other hand, if the flag LCF is set at step #171, it is decided that the low contrast search is being executed, then the program skips to step #174.

At step #174, the CCD integrations are started, and at step #175, the interruption $INT_1$ is allowed due to the completion of the CCD integrations.

Thereafter, it is decided at step #176 whether or not the lens has reached the end of its movable range. This decision is made by detecting whether or not a pulse is inputted to the terminal CNT within a certain period. When the lens reaches the end of its movable range, the lens is not allowed to move further. Therefore, a pulse is not outputted from the encoder ENLE, i.e., if a pulse is not inputted to the terminal CNT within a certain period, it is decided that the lens has reached the end of its movable range. A switch which is turned on or off when the lens has reached the end of its movable range may be provided according to which it can be detected whether or not the lens has reached the end of its movable range.

If it is decided at step #176 that the lens has not reached the end of its movable range, the program goes to step #181 at which the ON or OFF of the light measuring switch $S_1$ is checked. If "L" is inputted to the terminal $P_6$, it is decided that the switch $S_1$ is ON, then the program returns to step #176. If "H" is inputted to the terminal $P_6$, it is decided that the switch $S_1$ is OFF. Then, the program goes to step #180.

If it is decided at step #176 that the lens has reached the end of its movable range, the program goes to step #177. At step S177, it is detected whether or not the lens has moved the end of its movable range either once or twice. If it is detected that the lens has reached the end of its movable range for the first time, the program goes to step #182 at which data is outputted to the drive circuit DDR so as to rotate the lens drive motor MOL reversely. Then, the program returns to step #176 so that the low contrast search is performed in the reverse direction. If it is decided at step #177 that the lens has reached the end of its movable range for the second time, data is outputted to the drive circuit DDR to stop the lens drive motor MOL at step #178.

The above-described operation is briefly described as follows: The low contrast search is executed with the lens moved in a direction (for example, to the closest direction) from the current position. If an in-focus position cannot be detected before the lens reaches the end of its movable range, the lens is moved in the opposite direction (for example, distant direction) so as to execute the low contrast search of the region between the initial position and the other end (for example, the position at which the lens is focused on the infinity point), whereby the low contrast search can be executed in all the movable range. If, as a result of the low contrast search, the lens reaches the other end (for example, the position at which the lens is focused on the infinity point) of its movable range without obtaining a position at which focusing condition can be detected, the lens is stopped from being driven and the low contrast search is terminated.

When the lens drive motor MOL is stopped at step #178, the flag DDEF is set at step #179 so as to memorize that the low contrast search has been made, and a low contrast flag LCF is reset at step #180 so as to indicate that the low contrast search is not executed. Then, the program returns to the AF routine (FIG. 8).

Subroutines in AE Routine

Next, the subroutine (FIG. 11 through FIG. 14) in the AE routine are described hereinbelow.

Input Luminous Data

Figure 11:
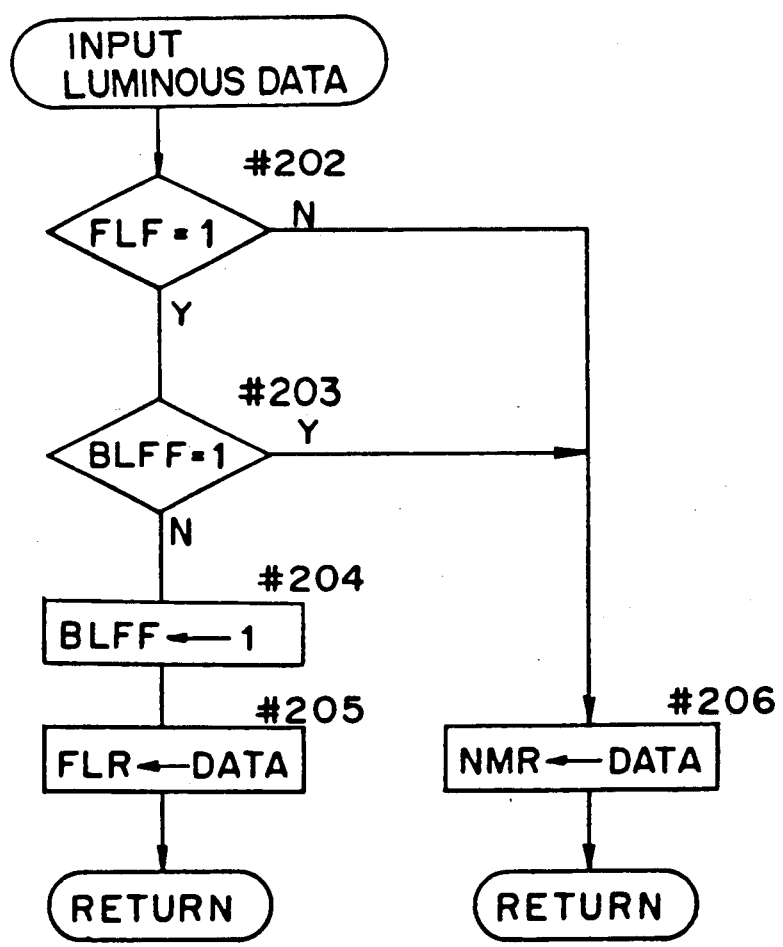

FIG. 11 is a flowchart showing the subroutine "input luminous data" (step #24) in the AE routine (FIG. 4). In this subroutine, values of measured lights which have entered the photodiodes $PD_0$ through $PD_5$ are inputted to the input/output terminal $SIO_0$ of the microcomputer MCB through the light measuring interface LIF and the serial data bus SDB, and the values of the measured lights are stored in either of two registers FLR and NMR according to the state when it is inputted to the microcomputer MCB.

It is detected at step #202 whether or not a focus lock is completed. If the focus lock flag FLF is set, it is decided that the focus lock is completed, so that the program goes to step #203. If the focus lock flag FLF is reset, it is decided that the focus lock is not competed, then the program goes to step #206.

It is detected at step #203 whether or not the AE lock (hereinafter referred to as focus AE lock), which is performed when the focusing condition is detected, is completed. If the flag BLFF is set, it is decided that the focus AE lock is completed. Then, the program goes to step #206. If the flag BLFF is reset, it is decided that the AE lock is not completed, then the program goes to step #204.

At step #204, the flag BLFF is set to indicate that the focus AE lock is completed and the values of measured lights are stored in the focus AE lock register FLR, then the program returns to the AE routine (step #25 in FIG. 4).

At step #206, the measured values of the lights are stored in a normal register NMR, then the program returns to the AE routine (step #25 in FIG. 4).

In these circumstances, the measured value of light is stored in the register FLR immediately after in-focus condition is obtained, and in the register NMR at other times.

Exposure Calculation

Figure 12:
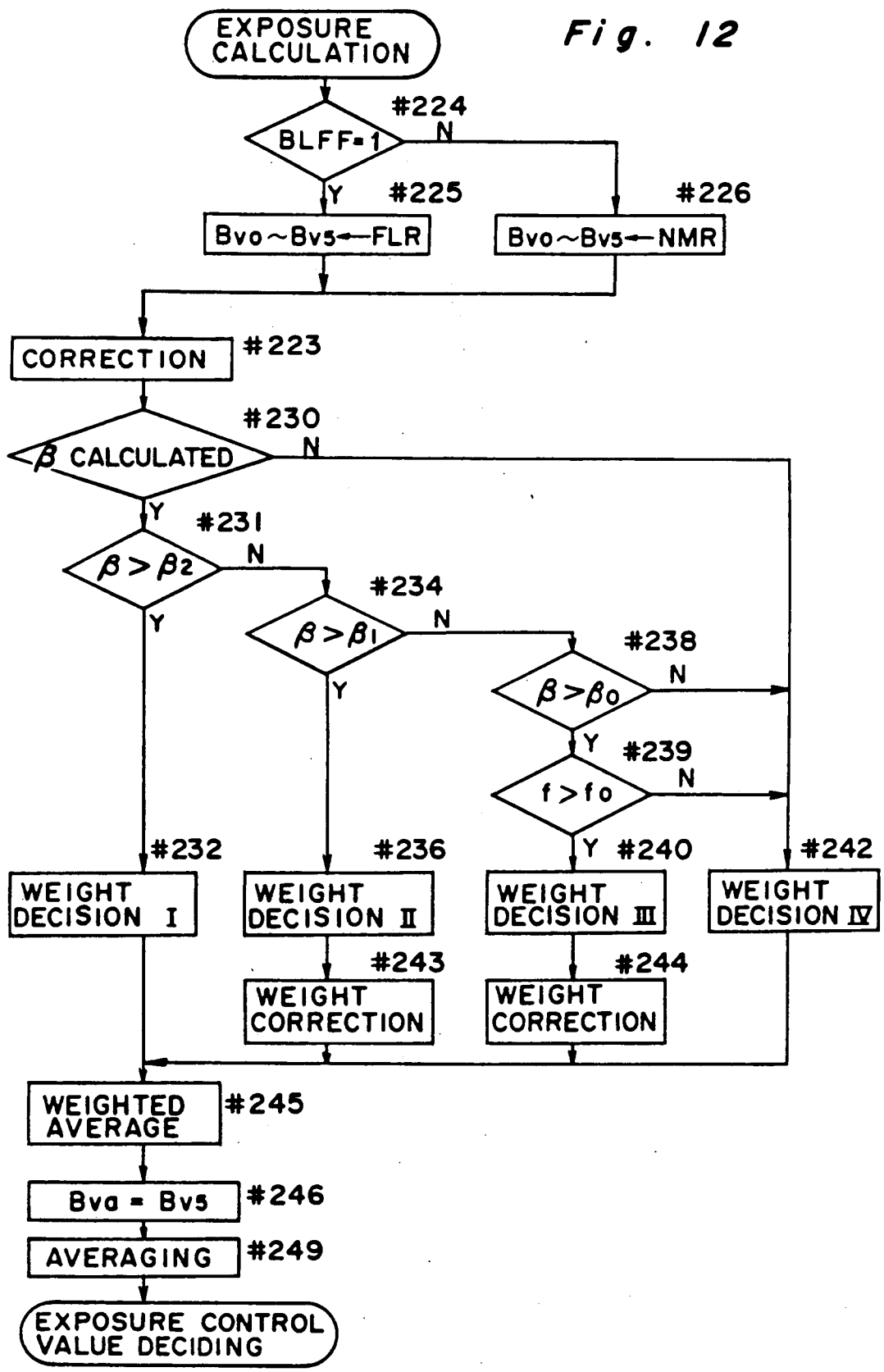

FIGS. 12 is flowcharts showing the subroutine "exposure calculation" (step #25) in the AE routine (FIG. 4).

In this subroutine, first it is detected at step #224 whether or not the focus AE lock is completed. If the flag BLFF is set, it is decided that the focus AE lock is executed, then the program goes to step #225 at which the measured light values stored in the focus AE lock register FLR are stored in the registers Bv0 through Bv5. If the flag BLFF is reset, it is decided that the focus AE lock is not executed, so that the program goes to step #226 at which the measured light values stored in the normal register NMR are stored in the registers Bv0 through Bv5.

When the measured light values are stored in the registers Bv0 through Bv5, the microcomputer MCB corrects measured light values at step #223 on the light receiving area and optical characteristics of the photodiodes $PD_0$ through $PD_5$, the minimum aperture value, an error in luminance measured according to the minimum aperture value (these two values are inputted from the lens circuit LEC). Thereafter, the program goes to step #230.

The luminance Bvs of the main object is calculated at step #230 in the following manner. First, the weight to the measured light values Bv0 through Bv5 is determined according to the photographing magnification $\beta$, and then the weight to the measured light values Bv0 through Bv5 is altered according to the same values Bv0 through Bv5. Under this circumstance, a weighted mean of each measured light value Bv0 through Bv5 is obtained as the luminance Bvs of the main object according to the weights to the same value Bv0 through Bv5 as determined in the above steps to be set. The detail of these steps will be described hereinbelow.

It is decided at step #230 whether or not the photographing magnification $\beta$ is calculated. If the photographing magnification $\beta$ is calculated, the program goes to step #231 to determine the weights for the calculation of the luminance Bvs of a main object according to the photographing magnification $\beta$ and the focal length (f) of the photographing lens. If the photographing magnification $\beta$ is not calculated, the program goes to step #242 so as to determine the weights for the calculation of the luminance Bvs of a main object according to Table 5 attached to the last part of this detailed description.

The program may go from step #230 to #242 only when the photographing lens is not mounted on the camera assuming that the photographing magnification $\beta$ is 1/60 until the photographing magnification is calculated at step #151 of the in-focus detection routine (FIG. 9). At this time, it is detected whether or not the photographing lens is mounted on the camera according to the data outputted from the lens circuit LEC. In addition, it may be designed the switching operation between the automatic focusing mode and manual focusing mode is effected, and when it is the manual focusing mode, the photographing magnification $\beta$ is set "1/60".

At step #231, the photographing magnification $\beta$ is compared with a predetermined magnification $\beta_2$ (for example, 1/40). If $\beta > \beta_2$, the program goes to step #232 at which the weights for calculation of the luminance Bvs of the main object are determined according to Table 4 attached to the last part of this detailed description.

Under this circumstances, when the photographing magnification $\beta$ is greater than the predetermined value, for example 1/40 in this embodiment, that is, it is a case of bust-shot, the light from the main object is assumed to be incident on the most area of the light measuring zone LMR as shown in FIG. 2. Accordingly, in this case, the weights to the measured light values Bv0, Bv1 and Bv2 respectively corresponding to the center light measuring regions 1, 2 and 3 are set to large ones, while the weights of the measured light values Bv3 and Bv4 respectively corresponding to the other light measuring regions 4 and 5 are set to small ones. More specifically, in this embodiment the weights of the measured light values Bv0, Bv1 and Bv2 respectively corresponding to the center light measuring regions 1, 2 and 3 are respectively set "2", while the weights of the measured light values Bv3 and Bv4 respectively corresponding to the other light measuring regions 4 and 5 are respectively set "1".

If $\beta \leq \beta_2$ at step #231, the program goes to step #234 at which the photographing magnification $\beta$ is compared with a predetermined magnification $\beta_1$ ($\beta_1 < \beta_2$, for example, 1/60). If $\beta > \beta_1$ (that is, $\beta_1 < \beta < \beta_2$), the program goes to step #236 at which the weights for calculation of the luminance Bvs of the main object is determined according to Table 5.

Under this circumstances, when the photographing magnification and the predetermined magnifications $\beta_1$ (1/60 in this embodiment) and $\beta_2$ are: $\beta_1 <\beta \leq \beta_2$, for example, in case that one's whole body is photographed in a picture having a vertical dimension is greater than a horizontal dimension, the image of the main object on the light measuring region LMR is smaller than that of the case where $\beta > \beta_1$, accordingly, the measured light values Bv3 and Bv4 respectively corresponding to the light measuring regions 4 and 5 are assumed to be affected by the luminance of the background. Accordingly, in the camera system of this embodiment, when the luminance Bvs of the main object is determined, the weights of the greater (brighter) one of the measured light values Bv3 and Bv4 at the light measuring zones 4 and 5 is set to relatively small value or zero. Specifically, as shown in Table 5, the measured light values Bv0, Bv1 and Bv2 at the light measuring regions 1, 2 and 3 are set "2", the weights of the smaller (darker) one of the measured light values Bv3 and Bv4 is set "1", and the greater one of the values Bv3 and Bv4 is set "0".

If $\beta \leq \beta_1$ at step #234, the program goes to step #238 at which the photographing magnification $\beta$ is compared with a predetermined photographing magnification $\beta_0$ ($\beta_0 < \beta_1 < \beta_2$, for example, 1/100). If $\beta > \beta_0$ (namely, $\beta_0 < \beta < \beta_1$), the program goes to step #239. At step #239, the focal length f of the photographing lens is compared with a predetermined focal length f (for example, 35 mm). If $f > f_0$, the program goes to step #240 at which the weights for the calculation of the luminance Bvs of the main subject is decided based on Table 6 attached to the last part of this description.

Under this circumstances, when the photographing magnification and the predetermined magnifications $\beta_0$ (1/100 in this embodiment) and $\beta_1$ are $\beta_0 < \beta \leq \beta_1$, for example, in case that one's whole body photographed in a picture having a vertical dimension is less than a horizontal dimension, the image of the main object on the light measuring region LMR is assumed to be very small. Therefore, in the camera system according to this embodiment, when the luminance Bvs of the main object is determined, the weights of the measured light values in the light measuring regions corresponding to the main zone or adjacent zone(s) are set "1", while the weights of the measured light values in the other light measuring regions are set "0". More specifically, as shown in Table 6, if no adjacent zone exists, the weights of the light measuring regions corresponding to the main zone are set "1", while the weights of the measured light values in the other light measuring regions are set "0". It is to be noted that the zero, first and second zones respectively correspond to the light measuring regions 1, 2 and 3 as shown in FIG. 2. Further, if the zero zone is the main zone and the second zone is the adjacent zone while the first zone is not the the adjacent zone, the weights of the measured light values Bv0 and Bv2 in the light measuring regions 1 and 3 corresponding the zero and second zones are respectively set "1", while the weights of the measured light values Bv1, Bv3 and Bv4 of the other zones 2, 4 and 5 are respectively set "0".

In addition, when the focus detecting mode is the spot mode in which, as previously described, the zero zone is the main zone and the first and second zones are the adjacent zones, the weights of the measured light values Bv0, Bv1 and Bv2 in the light measuring regions 1, 2 and 3 are respectively set "1". Accordingly, the average light measuring is carried out at the center portion of the photographing image plane FLM so that the influence due to the different reflections of the main object can be eliminated. As described later, since the light measuring data which is assumed not to correspond to the luminance of the main object is excluded at step #244, the accurate luminance Bvs of the main object can be obtained at the spot mode, even if the first and second zones are not the adjacent zones.

If $\beta \leq \beta_0$ at step #238 or f $\leq$ f$_0$ at step #239, the program goes to step #242. At step #242, the weights for the calculation of the luminance Bvs of the main object is decided according to Table 5. In this case, since the area of image of the main object on the photographing image plane FLM is pretty small, it is appropriate that the main object is regarded as a part of the background rather than a part separated from the background. Therefore, in the camera system according to this embodiment, in this case, the weights for the calculation of the luminance Bvs of the main object are decided in the same manner as step #236 in order to obtain the luminance Bvs using the measured light values at the wide light measuring regions, i.e. the measured light values Bv0-Bv4 at the light measuring regions 1-5.

Meanwhile, when f≦F$_0$ at step #239, the luminance Bvs of the main object is also similarly decided based on the measured light values at the wide light measuring regions. Therefore, even if, at a short focal length photographing, an error of the object distance D is present and the magnification $\beta$ is not a accurate value, it can be avoided that the luminance Bvs is decided based on the incorrect selection of the luminance Bv0-Bv5 resulting that the exposure value of the main object is far from the appropriate value.

Incidentally, when, as compared with the measured light values of the light measuring regions corresponding to the main zone (the light measuring regions 1, 2 and 3 in FIG. 2 correspond, respectively, to the zero, first and second zones), the measured light values of the other zones are extremely larger or extremely smaller, the latter values are assumed not to represent precisely the luminance Bvs of the main object because the latter value is influenced with the luminance of the background. Accordingly, it is not desirable that the luminance Bvs of the main object is decided based on the consideration of the measured light values far from the value of the main zone. Meanwhile, when the magnification $\beta$ is large, for example, $\beta > \beta_2$, most of the photographing image plane FLM is assumed to be occupied by the main object. Therefore, it is not appropriate that the measured light values are regarded not to represent the luminance Bvs of the main object on the ground that the measured light values are far form the measured light value of the main zone. On the contrary, when the magnification $\beta$ is pretty small, for example, $\beta \leq \beta_0$, it is desirable that the main object is regarded to be a part of the background. Therefore, in this case, it is not appropriate that the measured light values are regarded not to represent the luminance Bvs of the main object on the ground that the measured light values are far from the value of the main zone, too.

In view of the above, in the camera system according to this embodiment, when $\beta_1 < \beta \leq \beta_2$ or when $\beta_0 < \beta \leq \beta_1$ and f>f$_0$, the weights of the measured light values are decided at step #236 or #240, the program goes to step #243 or #244 at which the measured light values are corrected as follows. Namely, each of the measured light values Bv0-Bv5 is compared with the measured light value of the main zone, and then, when the resultant difference is over the predetermined value, for example, 2. 0 Ev, its weight is set to "0".

After the weights for the calculation of the luminance Bvs of the main object are decided at step #232 or #242, or after the decided weights are corrected at step #243 or #244, the weighted means of the measured light values according to the decided or corrected weights is determined as the luminance Bvs of the main object at step 145. For instance, if $\beta > \beta_2$, the luminance Bvs of the main object is calculated by the following equation.

$$Bvs = \frac{2(Bv0 + Bv1 + Bv2) + Bv3 + Bv4}{8}$$

If $\beta_1 < \beta \leq \beta_2$, Bv3>Bv4, the main zone is the zero zone, and the measured light value Bv4 is extremely smaller than the measured light value Bv0 of the light measuring region 1 corresponding to the main zone (the zero zone), for example, Bv0−Bv4>3Ev, then the luminance Bvs of the main object is calculated by the following equation.

$$Bvs = \frac{Bv0 + Bv1 + Bv2}{3}$$

After the luminance Bvs of the main object is calculated, the luminance Bva of the background is obtained at step #246. In the camera system according to this embodiment, the measured light value of the light measuring region 6 in the rectangular range LMR which is the widest light measuring area is regarded as the luminance Bva of the background. That is, $$Bva = Bv5$$

Incidentally, the camera system of this embodiment has a reflected light measuring system. Therefore, the measured light values are often influenced by the reflectance of the object. Accordingly, when an object having a low reflectance is at the center portion of the photographing image plane FLM, the measured light value of the center portion becomes small. As a result, despite it is actually a front light photographing, it may be regarded as a rear light photographing. On the contrary to the above, when an object having a high reflectance is at the center portion of the photographing image plane FLM, the measured light value of the center portion becomes large. As a result, despite the luminances of both center and peripheral portions are substantially the same, it may be decided that the center portion is much brighter than the peripheral portion.

Therefore, in the camera system of this embodiment, after the luminances Bvs and Bva of the main objects and background are calculated, the luminance Bvs of the main object is decided by averaging the luminances Bvs and Bva at step #249 to avoid an incorrect decision as to the luminance distribution of the field. With the exception of the special case of an object having extremely high or extremely low reflectance, the difference of the measured light value due to the reflectance falls normally in a predetermined range. According to this embodiment, when the difference of luminances between the center portion and its peripheral portion falls in a predetermined range, the measured light values of six light measuring regions are averaged. Specifically, when the difference (Bva−Bvs) of the luminances between the main object and background falls in a predetermined range, e.g. $-1.5 < Bva - Bvs < +1$, the weighted means are performed based on the weights as shown in Table 7, which is attached to the last part of this detailed description to obtain the averaged luminance of the main subject. The averaged luminance is referred to as Bvs2. That is, when $Bv3 > Bv4$, $$Bvs2 = \frac{2(Bv0 + Bv1 + Bv2 + Bv4) + Bv3 + Bv5}{10}, \text{ and}$$

when $Bv3 \leq Bv4$, $$Bvs2 = \frac{2(Bv0 + Bv1 + Bv2 + Bv3) + Bv4 + Bv5}{10}.$$

Further, when the difference (Bva−Bvs) does not fall in the above range, e.g. $Bva - Bvs \leq -1.5$, or $Bva - Bvs \leq 1$, the luminance of the main object is not averaged and the luminance Bvs of the main object is set as the averaged luminance Bvs2. That is, $$Bvs2 = Bvs.$$

After the luminances Bvs and Bva of the main object and background are obtained and the averaged luminance of the Bvs2 of the main object is obtained, the program goes to an exposure control value deciding routine.

Exposure Control Value Deciding Routine

Figure 13:
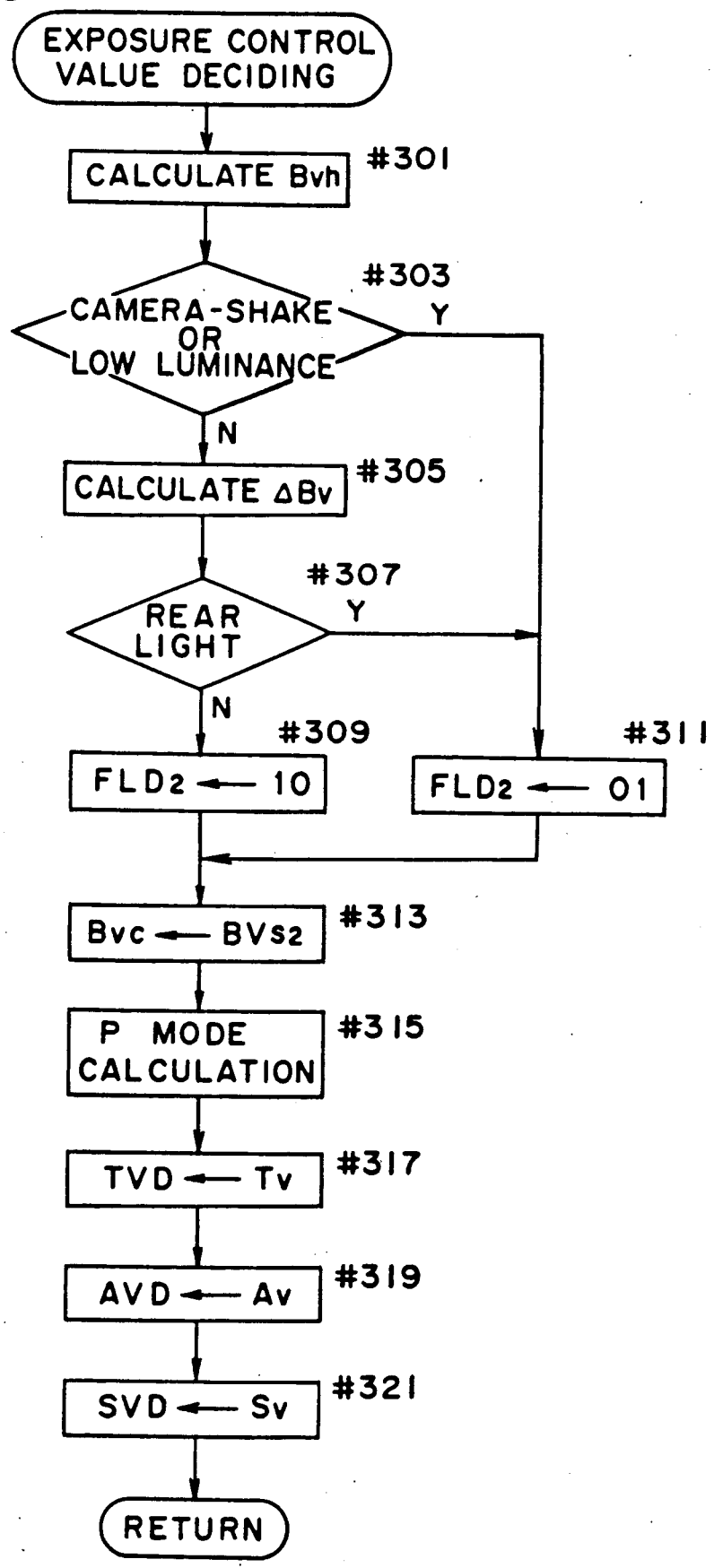

FIG. 13 is a flowchart showing an exposure control value deciding routine. At step #301, a minimum luminance Bvh for preventing a camera-shake is calculated. The luminance Bvh is calculated by the following equation under such a condition where the shutter speed is set a minimum value Tvh for preventing the camera-shake and the aperture is set the minimum aperture value Av0. That is, $$Bvh = Tvh + Av0 - Sv,$$

where Wv is film sensitivity

Thereafter, whether or not the averaged luminance Bvs2 of the main object falls in the camera-shake luminance range (i.e. $Bvs2 < 5$), is detected at step #303. If the luminance Bvs2 is not in the camera-shake luminance range and is over the predetermined value, that is, when $Bvs2 \geq Bvh$ and $Bvs2 \geq 5Ev$, the program goes to step #305 at which the difference of luminance $\Delta Bv$ ($= Bva - Bvs2$) is calculated. At step #307, whether or not it is a rear light, that is, whether or not the difference $\Delta Bv$ is larger than a predetermined value, APEX value: 2 in this embodiment, is detected. If it is detected not to be the rear light at step #307, that is, if $\Delta Bv \leq 2$ (EV), the program goes to step #309 at which $f10$"is stored in the indication 3data FLD2 so that the display circuit DSP is operated to display an information representing that the flash light emission is not necessary. On the contrary, if it is detected at step #303 that the luminance Bvs2 is in the camera-shake luminance range or is lower than the predetermined value, that is, if $Bvs2 < Bvh$ or $Bvs2 < 5$ Ev, the program goes to step #311. If it si detected at step #307 that it is the rear light, that is, $\Delta Bv > 2Ev$, the program goes to step #311. At step #311, "01"is stored in the indication data FLD2 so that the display circuit DSP is operated to display an information representing that the flash emission is required.

After the indication data FLD2 is set at step #309 or #311, a control luminance value Bvc is set as the averaged luminance Bvs2 of the main object at step #313. Thereafter, at step #315, the control aperture value Av and control shatter speed Tv are calculated based on a predetermined program line.

Thereafter, the control shutter speed Tv is set in the indication data TVD at step #317, the control aperture value Av is set in the indication data AVD at step #319, and the film sensitivity Sv is set in the indication data SVD at step #321. After the completion of setting of these information in the respective indication data, the program returns to "AE routine" (step #26 in FIG. 4).

Exposure Control

Figure 14:
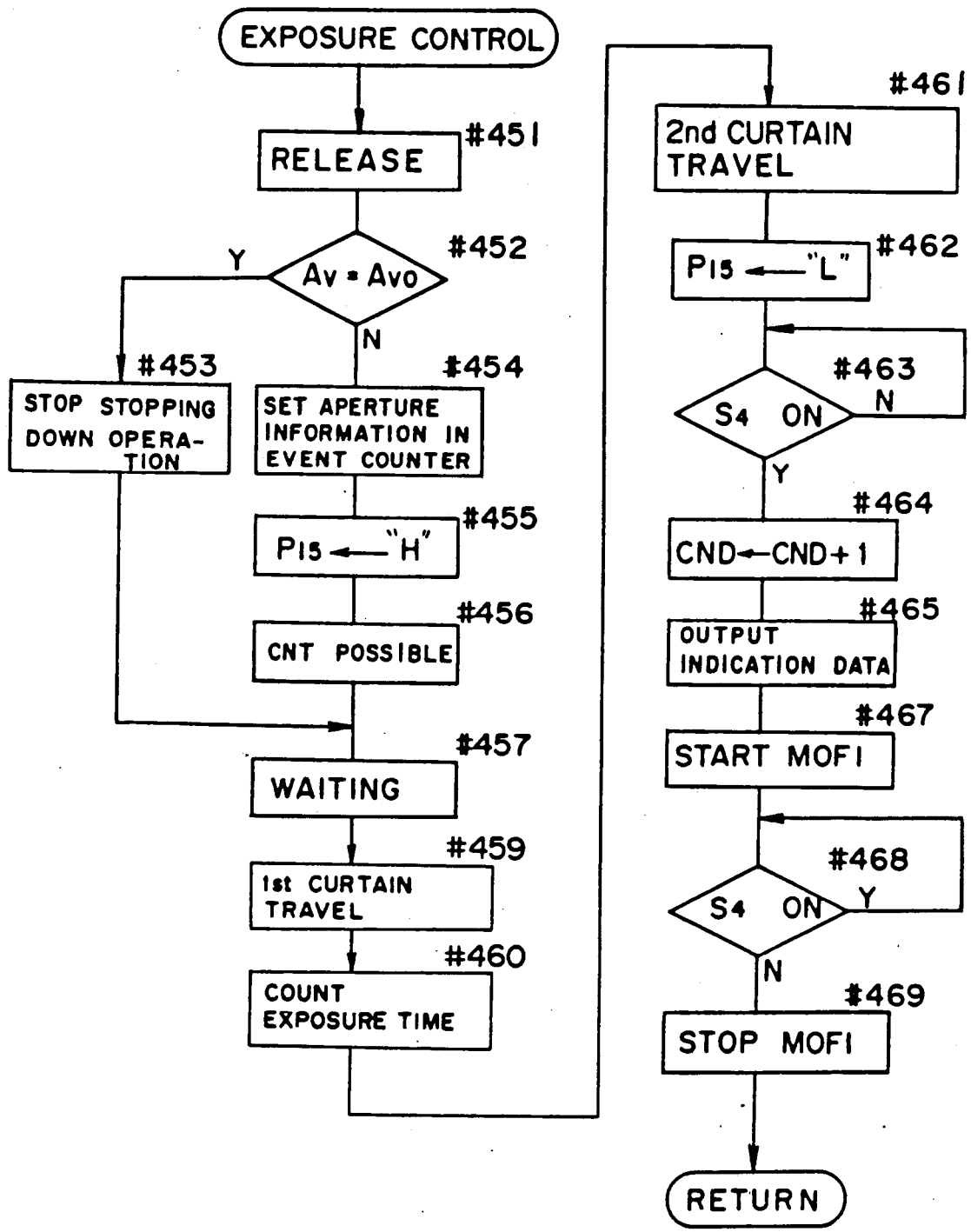

FIG. 14 is a flowchart showing the subroutine "exposure control". When the release button is depressed to the second stroke so as to turn on the release switch S2, the program goes from step #32 to #33 of the AE routine, that is, the program goes to step #451 in FIG. 14 to execute the processing.

First, data for repelling the release magnets RLM is transferred t the drive circuit DDR so as to move away the mirror provided diagonally in the photographing optical path from the optical path and release the aperture. Thus, the aperture begins to be stopped down at step #451. Thereafter, it is detected at step #452 whether or not the control aperture value Av equals to the minimum aperture value Av0. If the control aperture value Av is equal to the minimum aperture value Av0, data for repelling the magnet APM is transferred to the drive circuit DDR so as to stop the stopping down operation at step 453, then the program goes to step #457. If the control aperture value Av is unequal to the minimum aperture value Av0, the information of the difference (Av−Av0) between the control aperture value Av and the minimum aperture value Av, namely, the value to stop down the aperture, is set in the event counter at step #454, and "H" is outputted from the terminal P15 at step #455 so that the pulse outputted from the encoder ENAP is inputted to the counter terminal CNT. Thereafter, the counter interruption CNT is allowed at step 456. Then, the program goes to step 457. When the stopping down operation is completed, the event counter causes the counter interruption CNT. Then, as previously described about the counter interruption routine CNT (FIG. 10), data for repelling the magnets APM is transmitted to the drive circuit DDR. Thus, the aperture stopping down operation is completed.

At step #457, the microcomputer MCB waits until the mirror completely moves away from the photographing optical path. The waiting period is set to be longer than the period required for the aperture size to be reduced to the minimum.

Next, at step #459, data for repelling the attracting portions of the magnets ICM is transmitted from the microcomputer MCB to the drive circuit DDR, whereby the first curtain of the shutter travels. When the exposure time counted by the microcomputer MCB at step #460 becomes equal to the control exposure time Tv (already set), data for repelling the attraction portions of the magnets 2CM is transmitted to the drive circuit DDR at step #461. As a result, the second curtain of the shutter travels. Thereafter, at step #462, "L" is outputted from the terminal $P_{15}$ so that the pulse generated by the encoder ENLE can be inputted to the counter terminal CNT.

Thereafter, the microcomputer MCB waits at step #463 until the photograph completion detecting switch $S_4$ is turned on. As described above, the switch $S_4$ is turned on when the mirror pivots downward, the aperture is fully opened, and the travelling of the second curtain of the shutter is completed. When the switch $S_4$ is turned on, "1" is added to the indication data CND at step #464 and the indication data is transferred to the display circuit DSP at step #465 so that the display circuit DSP indicates the number of exposed frames of the film, exposure information, and so on. Then, at step #467, data for driving the film feeding motor MOFI is transmitted to the motor control circuit MOD through the drive circuit DDR to wind up the film, whereby the cocking mechanism interlocked with the film-winding mechanism is actuated. As a result, the shutter, the mirror, and the diaphragming mechanism are cocked. At step #468, the microcomputer MCB waits until the photograph completion detecting switch $S_4$ is turned off. As described previously, when the film-winding is completed and the shutter, the mirror, and the diaphragming mechanism have been cocked, the switch $S_4$ is turned off. When the switch $S_4$ is turned off, at step #469, the data for stopping the film feeding motor MOFI is transmitted to the motor control circuit MOD through the drive circuit DDR. Thereafter, the program goes to the switch determining routine II (FIG. 6).

Although the step for performing this operation is not shown in any of he flowcharts, when the microcomputer detects that the film is excessively tensed while the film is being wound, the film is rewound, as is known well. The above is the description of the operation of the embodiment to be performed when the light measuring switch $S_1$ is turned on.

First Modification

In the above-described embodiment, when the luminance Bvs of the main object is calculated, necessary measured data is selected from the measured data Bv0 through Bv5 according to the photographing magnification $\beta$, but measured data may be selected according to the main zone and the adjacent zone instead of the photographing magnification $\beta$.

Figure 15A:
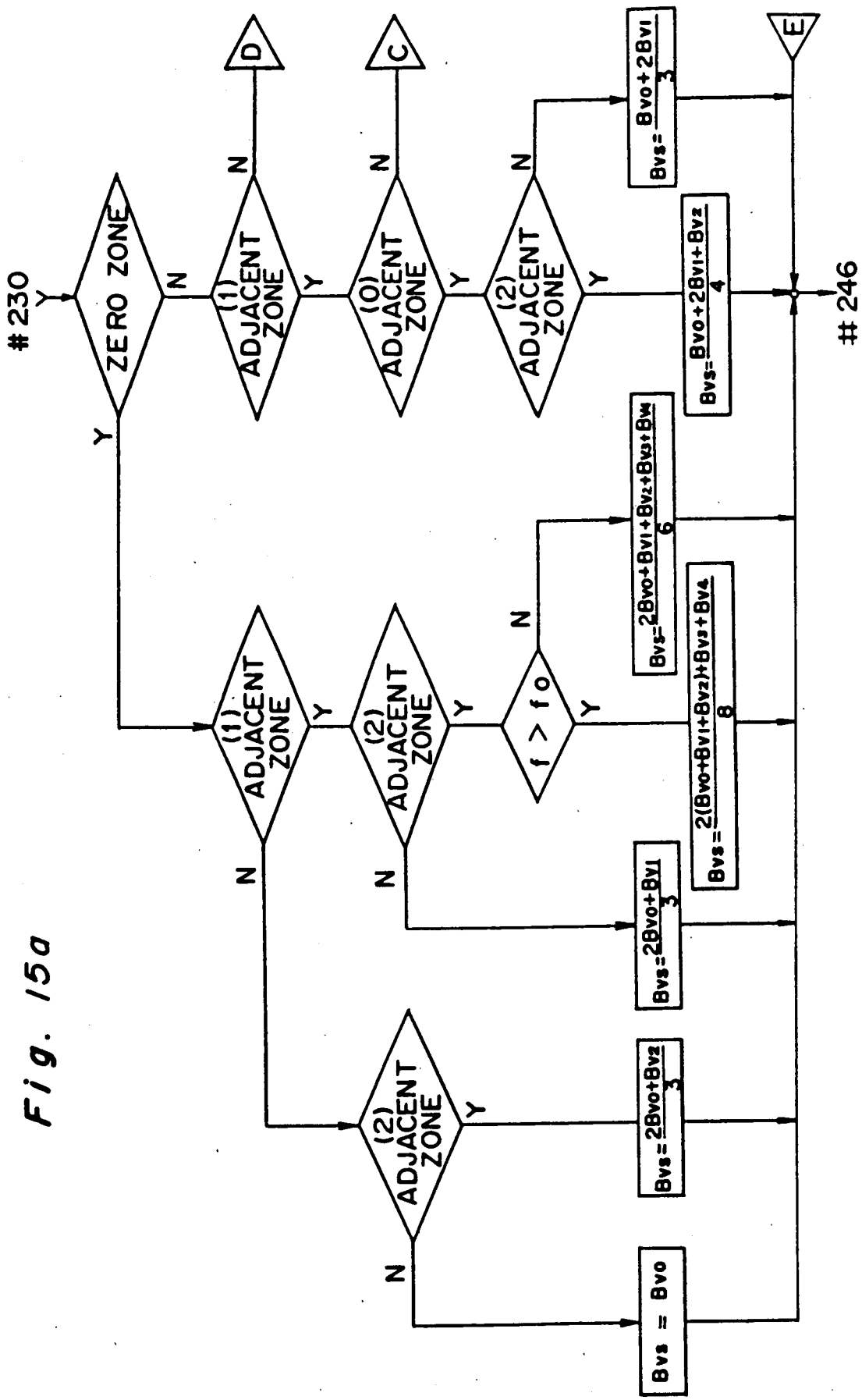
Figure 15B:
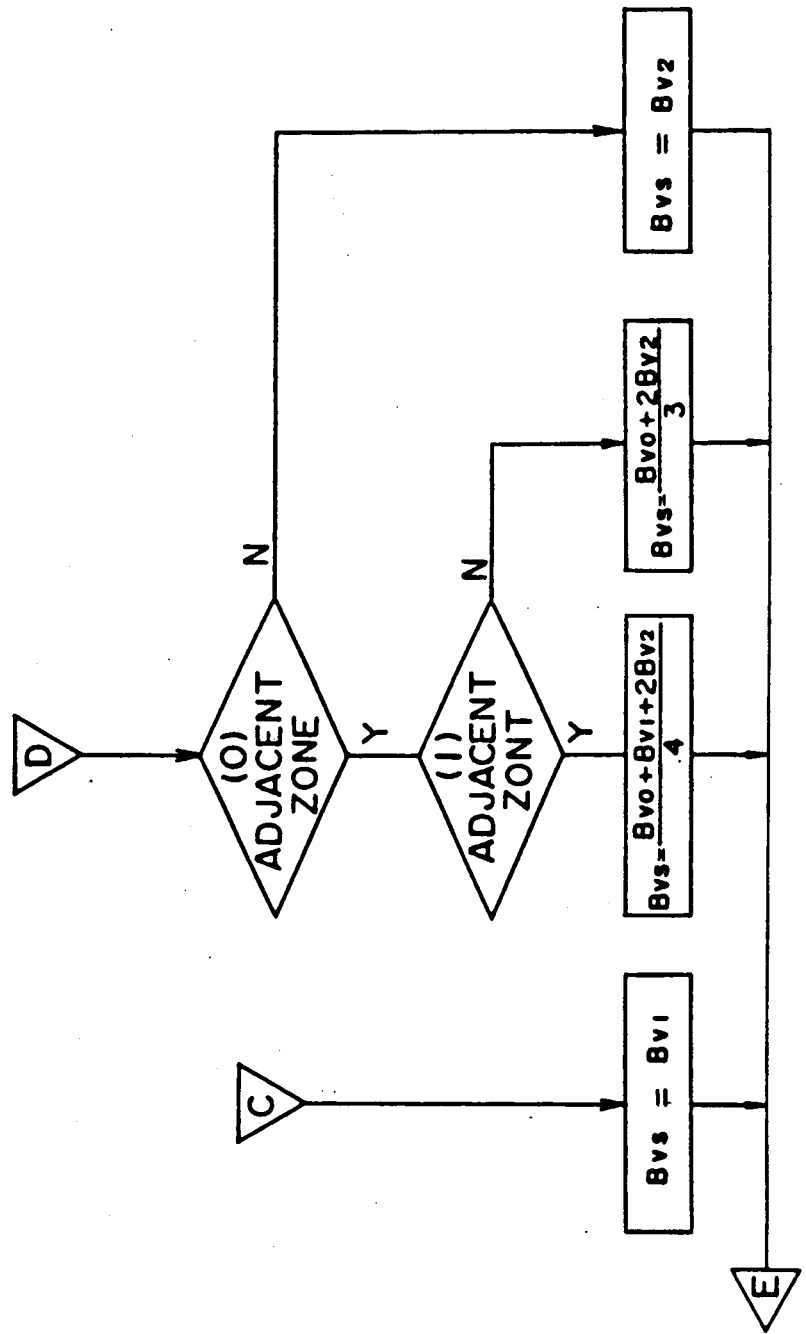

Specifically, steps #230 through #245 in FIG. 12 are altered as follows (refer to FIG. 15).

First, which of the zones is the main zone is detected. If the zero zone is the main zone, it is detected whether or not the first and second zones are adjacent zones. If the first (second) zone is the main zone, it is detected whether or not the zero zone is the adjacent zone. If the first (second) zone is the main zone and the zero zone is the adjacent zone, it is detected whether or not the second (first) zone is the adjacent zone.

If the zero zone is the main zone and both the first and second zones are the adjacent zones, the luminance Bvs of the main object is calculated depending on the five measured data Bv0 through Bv4. If the focal length of the photographing lens is longer than the predetermined focal length $f_0$ (for example, 50 mm), the luminance Bvs of the main object is calculated by the weighted mean by making the weights of the measured data Bv0 through Bv2 great. If the focal length of the photographing lens is shorter than the predetermined focal length $f_0$ the luminance Bvs of the main object is calculated by the weight mean in which the weight of the measured data Bv0 is great.

If the zero zone is the main zone and only the first (second) zone is the adjacent zone, the luminance Bvs of the main object is calculated depending on two measured data Bv0 and Bv1 (Bv2). At this time, the luminance Bvs of the main object is calculated by the weight mean in which the weight of the measured data Bv0 is great.

If the zero zone is the main zone and there are no adjacent zones, the measured data Bv0 is set as the luminance Bvs of the main object.

If the first (second) zone is the main zone and both the zero and the second (first) zones are the adjacent zones, the luminance Bvs of the main object is calculated depending on three measured data Bv0, Bv1, and Bv2. At this time, the luminance Bvs of the main object is calculated by the weighted mean in which the weight of the measured data Bv1 (Bv2) is great.

If the first (second) zone is the main zone and only the zero zone is the adjacent zone (if the second (first) zone is not the adjacent zone), the luminance Bvs of the main object is calculated depending on the two measured data Bv0 and Bv1 (Bv2) by the weight mean in which the weight of the measured data Bv1 (Bv2) is great.

If the first (second) zone is the main zone and there is no adjacent zone the measured data Bv1 (Bv2) is the luminance Bvs of the main object.

This modification allows the luminance Bvs of the main object to be calculated without obtaining the photographing magnification $\beta$.

Second Modification

In the camera system of the above described embodiment, when the focus detecting mode is the spot mode, the zero zone is made to be the main zone and the first and second zones are made to be the adjacent zones. Meanwhile, as described above, when a taking lens having a small open aperture size, i.e. large minimum aperture value Av0, is used, it is difficult to detect focusing condition in the first and second zones because of the eclipse on the periphery of the photographing image plane. Therefore, as the camera system of the above described embodiment, it is preferable that, in such a case, the influence caused by the difference of the reflectance is reduced by regarding the first and second zones as the adjacent zones. On the contrary, if a taking lens having a large open aperture size, i.e. small minimum aperture value Av0, is used, the above eclipse does not occur so that a precise focus detection can be performed in the first and second zones. Accordingly, even if the focus detecting mode is the spot mode, when the taking lens having a large open aperture size, i.e. small minimum aperture value Av0, for example, Av0 < 4 Ev, the focus detection may be performed in the first and second zones, too, the zero zone may be set the main zone regardless of the output of the CCD line sensors $ISL_0$, $ISL_1$ and $ISL_2$, and it may be detected whether or not the first and second zones are the adjacent zones similarly to the case of the wide mode.

In order to embody the above modification, the program is modified as follows.

Figure 16:
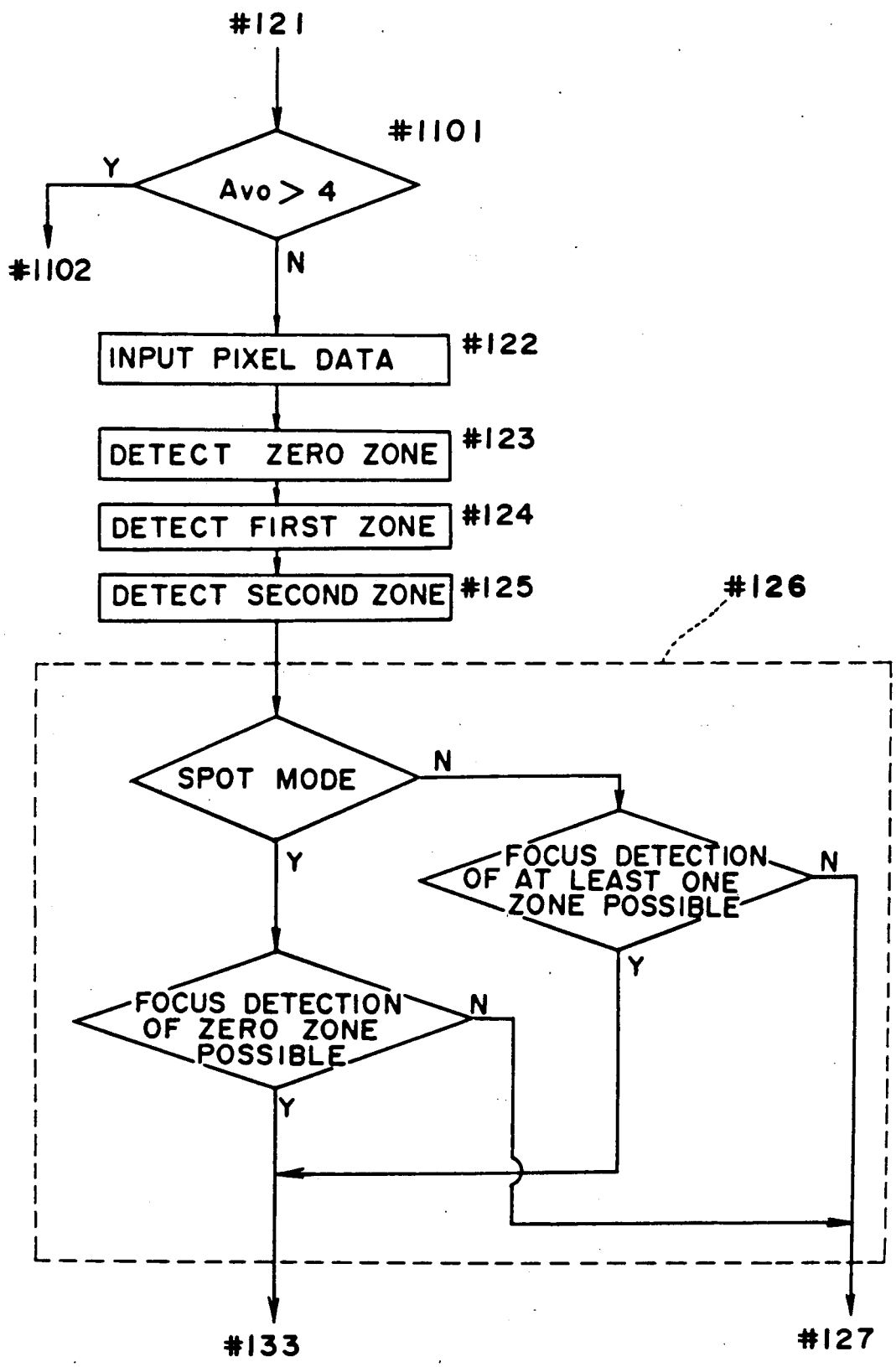

Namely, at step #1101 in FIG. 8, it is detected whether or not the minimum aperture value Av0 of a taking lens in use is larger than the predetermined value, for example, 4. Thereafter, if it is larger than the predetermined value, that is, Av0>4, the program goes to step #1102 in FIG. 8, while it is smaller than the predetermined value, that is, Av0<4, the program goes to step #122 in FIG. 8. Thereafter, at step #126 in FIG. 8, if it is detected that the focus detecting mode is the spot mode, it is detected subsequently whether or not the focus detection of the zero zone is available. If yes, the program goes to step #133, while if no, the program goes to step #127. When the focus detecting mode is the wide mode, similarly to the above embodiment, the focus detection of at least one of zone is available, the program goes to step #133, while no focus detection of all of the zones is available, the program goes to step #127 (refer to FIG. 16).

At step #1413 in FIG. 9, if the minimum aperture value Av0 is larger than the predetermined value, for example, Av0>4, the first and second zones are made the adjacent zones, while it is smaller than the predetermined value, that is, Av0≦4, it is detected whether or not the zones other than the main zone are the adjacent zones (refer to FIG. 17).

With the above modification of the program, in the spot mode, the accurate luminance Bvs of the main object can be detected similarly to the case of the wide mode.

Third Modification

Next, the modifications of the light measuring pattern are described by making reference to FIGS. 18a, 18b, 18c and 18d.

Figure 18A:
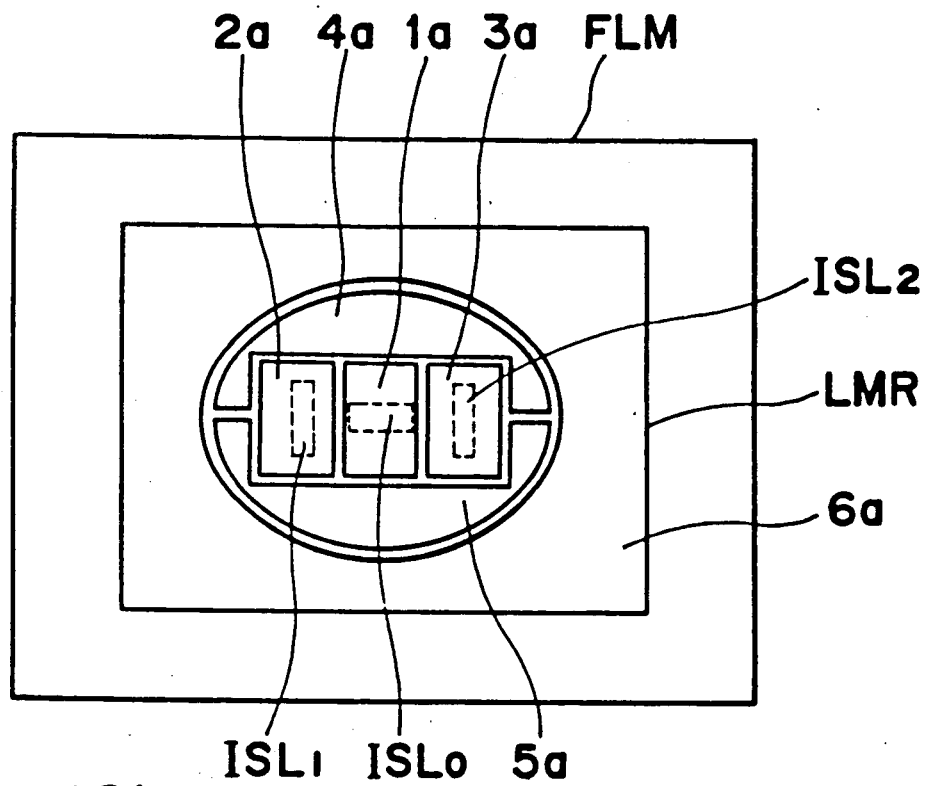
FIGS. 18a, 18b, 18c and 18d are views respectively showing light measuring ranges in the camera system which embodies the present invention.

FIG. 18(a) shows a first modification of the light measuring pattern. In this light measuring pattern, the light measuring regions (hereinafter referred to as region(s)) are determined in consideration of the positions of the CCD line sensors $ISL_0$ through $ISL_2$. That is, a rectangular region 1a is the region (zero zone) whose center area is used for the CCD line sensor $ISL_0$. A rectangular region 2a is the region (first zone) whose center area is used for the CCD line sensor $ISL_1$. The measured area of the region 2a is almost equal to that of the region 1a. A rectangular region 3a is the region (second zone) whose center area is used for the CCD line sensor $ISL_2$. The area of the region 3a is almost equal to that of the region 1a. Regions 4a and 5a are so located as to enclose the regions 1a, 2a, and 3a. The region 4a is disposed in the upper portions of the regions 1a, 2a, and 3a. The region 5a is disposed in the lower portions of the regions 1a, 2a, and 3a. This configuration of the light measuring pattern enables an accurate spot light measuring of the main object (namely, main object) located in the main zone.

Figure 18B:
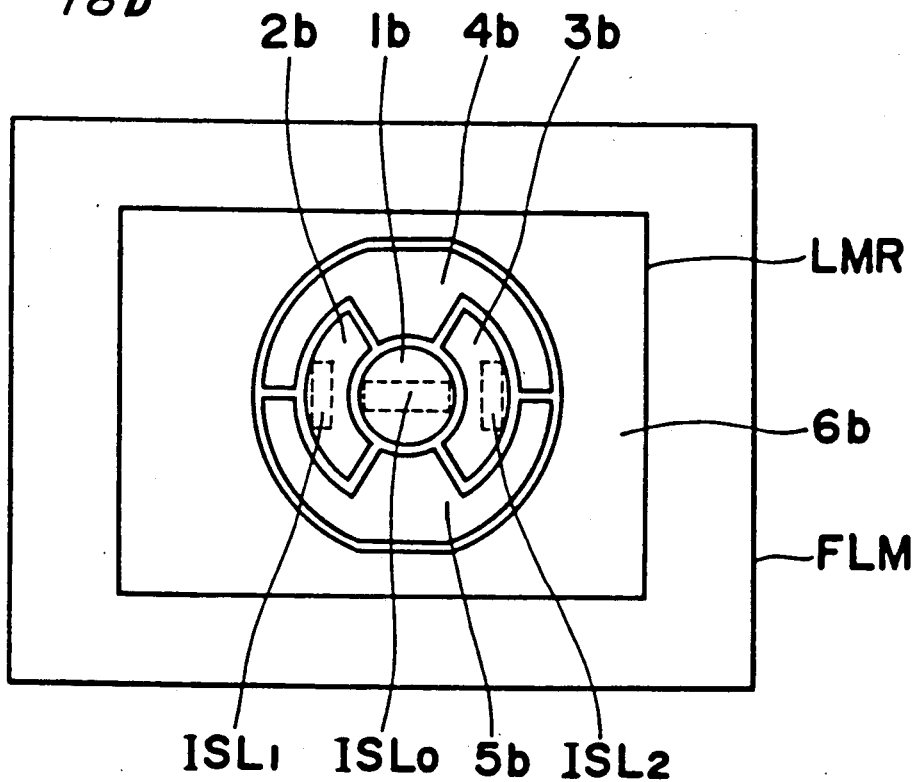

FIG. 18(b) shows the second modification of the light measuring pattern. This light measuring pattern is formed by adopting the advantage of the light measuring pattern shown in FIG. 2 and the light measuring pattern of the above-described first modification. That is, a region 1b is circular and located in the center of the region LMR to be measured. Sector regions 2b and 3b are located on the left and right sides of the region 1b, respectively. The areas of the regions 2b and 3b are almost equal to that of the region 1b. The regions 4b and 5b are so located as to enclose the regions 1a, 2b, and 3b. The region 4b is located on the upper portion of the regions 1a, 2b, and 3b. The region 5b is located on the lower portion of the regions 1a, 2b, and 3b. The configuration and area formed by the addition of the regions 1a, 2b, 3b, 4b, and 5b are the same as those of the addition of the regions 1, 2, 3, 4, and 5 of the light measuring patter shown in FIG. 2. This configuration of the light measuring pattern reduces the influence of lights which are incident on the upper and lower portions of the first (second) zone compared with the light measuring pattern shown in FIG. 2 when the main object is located in a small extent on the left (right) relative to the center of the field angle FLM.

Figure 18C:
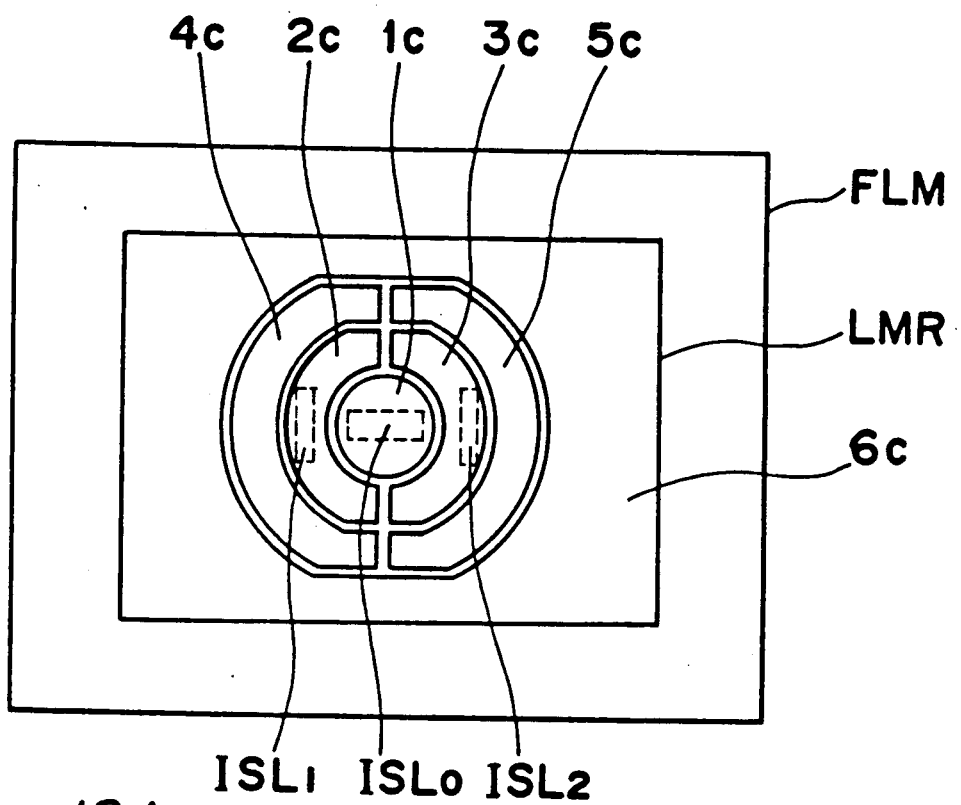

FIG. 18(c) shows the third modification of the light measuring pattern. In this modification, regions 4 and 5 shown in FIG. 2 are located on the left and right, that is, a region 4c which is C-shaped is located on the left of a region 2c, and a region 5c which is C-shaped is located on the right side of a region 3c. This configuration of the light measuring pattern enables a fine light measuring based on the dimension of the object image regardless of whether the main zone is either of the zero through the second zone.

Figure 18D:
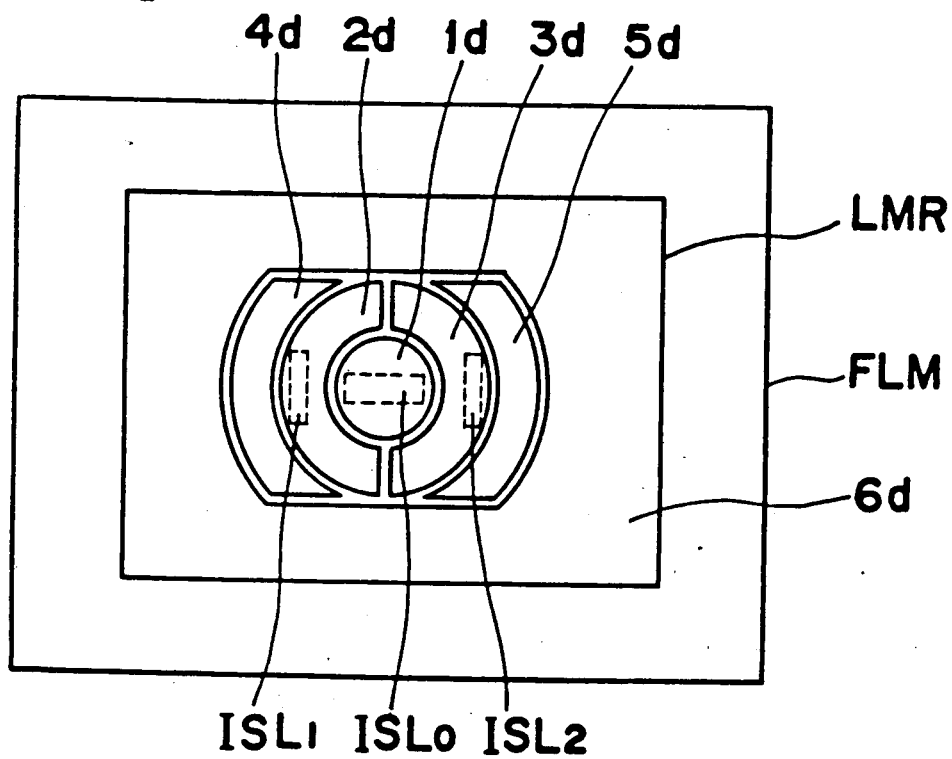

FIG. 18(d) shows the fourth modification of the light measuring pattern. In this modification the upper and lower portions of the regions 4c and 5c of the third modification are removed. This configuration of the light measuring pattern enables a fine light measuring based on the dimension of the object image regardless of whether the main zone is either of the zero through the second zone similarly to the third modification. In addition, compared with other light measuring patterns, the light measuring area 6d surrounding regions 1d through 5d is great. Therefore, the sensitivity with respect to the background light is increased.

In the above-described embodiment and modifications, no light measuring regions are provided between the second and third regions, but another second or third light region may be provided therebetween.

A known means, for example, a mercury switch may be provided to detect whether an object is photographed with the camera widthwise or lengthwise so that the method for performing the calculations of the luminances of the main object and the background ar changed according to the direction in which the main object is photographed.

For example, when the main object is photographed widthwise using the light measuring pattern shown in FIG. 2 and those shown in FIGS. 18a and 18b, the luminance of the background is calculated by setting the weights of the regions 4, 4a, and 4b located on the upper portion smaller than those of the regions 5, 5a, and 5b. Owing to this arrangement the influence of the regions located on the upper portions on which lights are incident from a bright sky. When the main object is photographed lengthwise, the luminance of the background is calculated by setting the weights of the values of the lights incident on the regions 4, 4a, and 4b equal to the weights of the values of the lights incident on the regions 5, 5a, and 5b. When the main object is photographed lengthwise, if the relationship between the photographing magnification $\beta$ and the predetermined photographing magnifications and $\beta_0$ and $\beta_1$ is $\beta_0 < \beta < \beta_1$, the luminance of the main object is calculated by setting the weights of the values of the lights incident on the regions 2, 2a, and 2b which are normally located on the upper portion smaller than the weights of the values of the lights incident on the regions 3, 3a, and 3b which are normally located on the lower portion.

Similarly, when the main object is photographed widthwise using the light measuring pattern shown in FIGS. 18c and 18d, the luminances of the main object and the background are calculated by setting the weights of the regions 2c, 4c, 2d, and 4d located on the left side equal to the weights of the values of the lights incident on the regions 3c, 5c, 3d, and 5d located on the right side. When the main object is photographed lengthwise, if the relationship between the photographing magnification $\beta$ and the predetermined photographing magnifications $\beta_1$ and $\beta_2$ is $\beta_1 < \beta < \beta_2$, the luminance of the background is calculated by setting the weights of the values of the lights incident on the regions 4c and 4d which are normally located on the upper portion smaller than the weights of the values of the lights incident on the regions 5c and 5d which are normally located on the lower portion. If the relationship between the photographing magnification and the predetermined photographing magnifications $\beta_1$ and $\beta_0$ is $\beta_0 < \beta < \beta_1$, the luminance of the main object is calculated by setting the weights of the regions 2c and 2d small and the luminance of the background is calculated by reducing the weights of the regions 4c and 4d. If the relationship between the photographing magnification $\beta$ and the predetermined photographing magnification $\beta_0$ is $\beta < \beta_0$, the luminances of the main object and the background ar calculated by reducing the weights of the values of the light incident on the regions 4c and 4d or the weights of the values of the light incident on the regions 2c, 4c, 2d, and 4d.

When the main object is photographed lengthwise, a means may be provided to detect which of the left and right of the camera is upper so that the luminance of the main object is calculated by reducing the weight of the value of the light incident on the region located upwards.

Forth Modification

In the above embodiment, the information representing that the flash emission is requested is indicated when the photographing is performed under the rear light or low luminance conditions including the case of a camerashake luminance range, the flash may be alternatively designed to be emitted automatically. The exposure control value deciding routine applied to this case is described in, for example U.S. Patent application Ser. No. 307,744 filed on Feb. 8, 1989.

Although the present invention has been fully described by way of example with reference to the accompanying drawings, it is to be noted here that various changes and modifications will become apparent t those skilled in the art. Therefore, unless such changes and modifications depart from the scope of the present invention, they should be construed as included therein.

TABLE 1

| terminal | I/O | |
|---|---|---|
| $P_0$ | output | A-D control terminal<br>A-D converter is actuated by "L" |
| $P_1$ | output | chip select terminal<br>light measuring interface LIF is selected by "L" |
| $P_3$ | output | chip select terminal<br>display circuit DSP is selected by "L" |
| $P_4$ | output | chip select terminal<br>lens circuit LEC is selected by "L" |
| $P_5$ | output | power control terminal<br>DC-to-DC converter VG is actuated by "L" |

TABLE 1-continued

| terminal | I/O | |
|---|---|---|
| $P_6$ | input | terminal for detecting light measuring switch $S_1$.<br>"L" when $S_1$ is ON |
| $P_{12}$ | input | terminal for detecting release switch $S_2$<br>"L" when $S_2$ in ON |
| $P_{13}$ | input | terminal for detecting photographing completion detecting switch $S_4$<br>"L" when $S_4$ is ON |
| $P_{15}$ | output | encoder selection terminal<br>ENAP is selected by "H"<br>ENLE is selected by "L" |
| $P_{16}$ | input | terminal for detecting focus detecting region selecting switch AFS<br>"L" when AFS is ON |
| STCK | output | reference clock output terminal<br>reference clock is outputted to interfaces LIF and AIF |
| $\overline{INT_0}$ | input | interruption terminal<br>interruption starts in synchronization with fall |
| $\overline{INT_1}$ | input | interruption terminal<br>interrruption starts in synchronization with fall |
| $SIO_0$ | input & output | serial data input/output terminal |
| $SIO_1$ | input & output | serial data input/output terminal |
| DDO | output | drive data output terminal |

TABLE 2

| flag | content | upper state: set (1)<br>lower stage: reset (0) |
|---|---|---|
| AEF | exposure calculation is | completed<br>not completed |
| BLFF | AE lock due to in-focus condition is | completed<br>not completed |
| DDFF | low contrast search is | completed<br>not completed |
| FDF | AF operation is | not completed<br>completed |
| FLF | focus lock is | completed<br>not completed |
| LCF | focusing condition data is | reliable<br>not reliable |
| RIHF | release operation is | prohibited<br>permitted |

TABLE 3

| display data | content of indication | |
|---|---|---|
| AFD | focusing condition | 00 ... indication OFF<br>01 ... in-focus<br>10 ... undetectable |
| AVD | control aperture value (Av) | |
| CND | number of exposed frames | |
| FLD | flash information | 00 ... indication OFF<br>01 ... flash emission desirable<br>10 ... flash emission unnecessary |
| SVD | film sensitivity (Sv) | |
| TVD | control exposure time (Tv) | |

TABLE 4

| Bv0 | 2 |
|---|---|
| Bv1 | 2 |
| Bv2 | 2 |
| Bv3 | 1 |
| Bv4 | 1 |

TABLE 5

|     | $Bv_3 > Bv_4$ | $Bv_3 \leq Bv_4$ |
| --- | --- | --- |
| Bv0 | 2 | 2 |
| Bv1 | 2 | 2 |
| Bv2 | 2 | 2 |
| Bv3 | 0 | 1 |
| Bv4 | 1 | 0 |

TABLE 6

| | first zone | | | | zero zone | | | | second zone | | | |
| --- | --- | --- | --- | --- | --- | --- | --- | --- | --- | --- | --- | --- |
| | 0 f | | 0 n | | 1 n | | 1 f | | 0 n | | 0 f | |
| | 2 n | 2 f | 2 n | 2 f | 2 n | 2 f | 2 n | 2 f | 1 f | 1 n | 1 f | 1 n |
| Bv0 | 0 | 0 | 1 | 1 | 1 | 1 | 1 | 1 | 1 | 1 | 0 | 0 |
| Bv1 | 1 | 1 | 1 | 1 | 1 | 0 | 0 | 0 | 0 | 1 | 1 | 0 |
| Bv2 | 1 | 0 | 1 | 0 | 1 | 0 | 1 | 0 | 1 | 1 | 1 | 1 | f: far, n: near
i far: object in (i) zone is far from main object
i near: object in (i) zone is near main object
(i = 0, 1, 2)

TABLE 7

|     | $Bv_3 > Bv_4$ | $Bv_3 \leq Bv_4$ |
| --- | --- | --- |
| Bv0 | 2 | 2 |
| Bv1 | 2 | 2 |
| Bv2 | 2 | 2 |
| Bv3 | 1 | 2 |
| Bv4 | 2 | 1 |
| Bv5 | 1 | 1 |

What is claimed is:

1. An exposure control system for a camera system comprising:

first light measuring means for measuring light incident on a first light measuring region located at a center of a photographing image plane;

second light measuring means for measuring light incident on a second light measuring region of the photographing image plane different from said first light measuring region;

first focus adjusting information outputting means for outputting a first focus adjusting information representing a focus adjusting condition at a first focus detecting region corresponding to said first light measuring region;

second focus adjusting information outputting means for outputting a second focus adjusting information representing a focus adjusting condition at a second focus detecting region corresponding to said second light measuring region said second focus detecting region being physically separate and distinct from the first focus detecting region;

switching means for switching alternatively between first and second focus detecting modes, the first focus detecting mode detecting the focus adjusting conditions at the first and second focus detecting regions based on the first and second focus adjusting information, the second focus detecting mode detecting the focus adjusting conditions at only the first focus detecting region based on the first focus adjusting information;

detecting means for detecting what relationship the focus adjusting condition at the first focus detecting region has with the focus adjusting condition at the second focus detecting region in the first focus detecting mode;

deciding means for deciding a combination of weights to be applied to outputs from said first and second light measuring means based on the relationship detected by said detecting means;

designating means for designating a combination of weights to be applied to outputs from said first and second light measuring means without using the first focus adjusting information and the second focus adjusting information in the second focus detecting mode; and calculating means for calculating a luminance of an object by applying the weights, which were decided by said deciding means, or the weights, which were designated by said designating means, to outputs from said first and second light measuring means; and means for controlling exposure in accordance wit the calculated luminance of said object.

2. A camera system as claimed in claim 1, wherein said deciding means comprises an operation member which is manually operated to switch between the first and second focus detecting modes.

3. A camera system as claimed in claim 1, wherein said deciding means comprises an output means for outputting a minimum aperture value of a taking lens, the second focus detecting mode being selected when the minimum aperture value of the taking lens is larger than a predetermined value, which occurs when an open aperture size of the taking lens is smaller than a predetermined value.

4. An exposure control system for a camera system comprising:

light measuring means for measuring light incident on a plurality of regions of a photographing image plane;

calculating means or calculating the luminance of an object based on outputs of said light measuring means;

first focus detecting means for detecting a focusing condition at a first region of the photographing image plane;

second focus detecting means for detecting a focusing condition at a second region, separate from the first region, of the photographing image plane;

switching means for switching between first and second modes;

output means for outputting, in the first mode, focusing condition data based only on an output of said first focus detecting means and, in the second mode, focusing condition data based on outputs of both said first and second focus detecting means; and altering means for altering a luminance calculation based on which of the modes is selected by said switching means; and means for controlling exposure in accordance with the altered luminance calculation of said object.

5. An exposure control system for a camera system comprising:

first focus detecting means for detecting a focusing condition at a first region of the photographing image plane;

second focus detecting means for detecting a focusing condition at a second region, separate from the first region, of the photographing image plane;

switching means for switching between first and second modes;

output means for outputting, in the first mode, focusing condition data based only on an output of said first focus detecting means and, in the second mode, focusing condition data based on outputs of both said first and second focus detecting means; and altering means for altering light measuring patterns based on the mode selected by the switching means; and means for controlling exposure in accordance with the altered light measuring patterns.

6. An exposure control system for a camera system comprising:

light measuring means for measuring light incident on a plurality of regions of a photographing image plane;

first focus detecting means for detecting a focusing condition at a first region of the photographing image plane;

second focus detecting means for detecting a focusing condition at a second region, separate from the first region, of the photographing image plane;

switching means for switching between first and second modes;

output means for outputting, in the first mode, focusing condition data based only on an output of said first focus detecting means and, in the second mode, a focusing condition data based on outputs of both said first and second focus detecting means;

deciding means for deciding a combination of weights to be applied to outputs of said light measuring means with outputs of said first and second focus detecting means in the first mode and for deciding a combination of weights to be applied to outputs of said light measuring means without outputs of said first and second focus detecting means int he second mode; and calculating means for calculating a luminance of an object based on outputs of said light measuring means being weighted by the combination of weights decided by said deciding means; and means for controlling exposure in accordance with the calculated luminance of said object.

7. A camera system as claimed in claim 4, wherein said altering means alters the luminance calculation by selectively varying a combination of weights applied to outputs of said light measuring means.

8. An exposure control system for a camera comprising:

light measuring means for measuring light incident on a plurality of regions of a photographing image plane;

focus detecting means for detecting a focus condition with respect to each one of a plurality of distinct and separate focus detection regions;

determining means for determining a location of a main object based on a plurality of focus conditions detected by said focus detecting means;

calculating means for calculating, in a first mode, a defocus amount based on a focus condition detected at a focus detection region corresponding to said location of said main object and, in a second mode, a defocus amount based on a focus condition detected at a predetermined focus detection region; and output means for outputting, in said first mode, a luminance value of said photographing image plane on the basis of light values measured and weighted according to a light measuring region corresponding to said object location and, in said second mode, a luminance value of said photographing image plane on the basis of light measuring values that are not weighted according to said light measuring region corresponding to said object location.

* * * * *